United States Patent
Asada et al.

(10) Patent No.: US 7,716,718 B2
(45) Date of Patent: May 11, 2010

(54) ELECTRONIC DEVICE NETWORK SYSTEM AND DATA RECEIVER SEARCH METHOD USING ELECTRONIC DEVICE NETWORK SYSTEM

(75) Inventors: Naoki Asada, Kitakatsuragi-gun (JP); Hiroshi Yamashita, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 915 days.

(21) Appl. No.: 10/767,878

(22) Filed: Jan. 28, 2004

(65) Prior Publication Data

US 2004/0187022 A1 Sep. 23, 2004

(30) Foreign Application Priority Data

Jan. 29, 2003 (JP) ............................. 2003-020937

(51) Int. Cl.
H04L 9/32 (2006.01)
(52) U.S. Cl. .............................. 726/2; 726/26; 358/1.14
(58) Field of Classification Search .................. 726/2, 726/26–31; 358/1.14, 441; 380/243–246
See application file for complete search history.

(56) References Cited

U.S. PATENT DOCUMENTS

| | | | |
|---|---|---|---|
| 5,880,447 A | | 3/1999 | Okada et al. |
| 6,052,781 A * | | 4/2000 | Weber .......................... 726/22 |
| 6,212,606 B1 * | | 4/2001 | Dimitroff ..................... 711/147 |
| 6,405,315 B1 * | | 6/2002 | Burns et al. .................. 713/190 |
| 6,459,499 B1 * | | 10/2002 | Tomat .......................... 358/1.15 |
| 6,799,259 B1 * | | 9/2004 | Reed, Jr. ....................... 711/163 |
| 2002/0103903 A1 * | | 8/2002 | Bruton et al. ................. 709/225 |
| 2002/0147924 A1 * | | 10/2002 | Flyntz .......................... 713/200 |
| 2002/0157022 A1 * | | 10/2002 | Katada et al. ................ 713/201 |

(Continued)

FOREIGN PATENT DOCUMENTS

JP 02-004037 1/1990

(Continued)

OTHER PUBLICATIONS

"more NFS over TCP stuff" http://playground.sun.com/pub/nfsv4/webpage/nfsv4-wg-archive-dec-96-jan-03/0283.html.*

(Continued)

*Primary Examiner*—Kimyen Vu
*Assistant Examiner*—Thomas Gyorfi
(74) *Attorney, Agent, or Firm*—Edwards Angell Palmer & Dodge LLP; David G. Conlin; William J. Daley, Jr.

(57) ABSTRACT

A printing system in one implementation of an electronic device network system of the present invention includes a plurality of hosts, a plurality of storages, and a plurality of printers, wherein the hosts, storages, and printers are connected to one another on the Internet. The hosts, storages, and printers each have one of two data protecting functions, and each have three security levels. As a result, there is provided an electronic device network system that enables a user to transmit data through a transmission route according to a user's desired security level, while taking into account protection (security) of transmitted data between electronic devices on the network. In addition, there is also provided a data receiver search method using such an electronic device network system.

19 Claims, 18 Drawing Sheets

U.S. PATENT DOCUMENTS

2002/0174369 A1* 11/2002 Miyazaki et al. ............ 713/202

FOREIGN PATENT DOCUMENTS

| JP | 07-214872 | 8/1995 |
| --- | --- | --- |
| JP | 10-021022 | 1/1998 |
| JP | 11-296327 | 10/1999 |
| JP | 11-301058 | 11/1999 |
| JP | 2001-028641 | 1/2001 |
| JP | 2002-300191 | 10/2002 |
| WO | WO 03/007167 A1 | 1/2003 |

OTHER PUBLICATIONS

Excerpts from the Firewalls FAQ. http://www.faqs.org/faqs/firewalls-faq/ (pp. 1-5).*
Boyce, Jim. "Windows 2000 Quick Fixes" © 2000 O'Reilly Media, Inc. Excerpts from Chapter 8 (13 pages total).*
ZoneAlarm documentation compiled between Apr. 12, 2001 and Jun. 4, 2001. © 1999-2001 Zone Labs Inc. Full PDF available at http://web.archive.org/web/20030830113603/http://www.cogeco.com/files/pdf/internetconn_userguides/za.pdf.*

* cited by examiner

FIG. 3 (a) STORAGE INFORMATION STORING SECTION

| STORAGE NAME | STORAGE FEE | DATA PROTECTION FUNCTION (LEVEL) | |
|---|---|---|---|
| STORAGE SA | 200 YEN | ONLY ENCRYPTION PROTOCOL 2.0 ENCRYPTION STORAGE, BACKUP FUNCTION | HIGH (TOP SECRET) |
| STORAGE SB | 100 YEN | ONLY ENCRYPTION PROTOCOL 1.0 | MEDIUM |
| STORAGE SC | FREE | — | LOW |

FIG. 3 (b) PRINTER INFORMATION STORING SECTION

| PRINTER NAME | DATA PROTECTION FUNCTION (LEVEL) | | LOCATION | PRINTER FUNCTION |
|---|---|---|---|---|
| PRINTER PA | ENCRYPTION PROTOCOL 2.0 ENCRYPTION PROTOCOL 1.0 DECRYPTION FUNCTION | TOP SECRET | CONVENIENCE STORE A | COLOR PRINTING, DOUBLE-SIDED PRINTING |
| PRINTER PB | ENCRYPTION PROTOCOL 2.0 ENCRYPTION PROTOCOL 1.0 | HIGH | CONVENIENCE STORE B | DOUBLE-SIDED PRINTING, STAPLING |
| PRINTER PC | ENCRYPTION PROTOCOL 1.0 | MEDIUM | CONVENIENCE STORE C | COLOR PRINTING, DOUBLE-SIDED PRINTING, STAPLING |
| PRINTER PD | — | LOW | CONVENIENCE STORE D | DOUBLE-SIDED PRINTING, STAPLING |

FIG. 3 (c) HOST INFORMATION STORING SECTION

| HOST NAME | DATA PROTECTION FUNCTION |
|---|---|
| HOST HA | ENCRYPTION PROTOCOL 2.0 ENCRYPTION PROTOCOL 1.0 |
| HOST HB | ENCRYPTION PROTOCOL 2.0 ENCRYPTION PROTOCOL 1.0 |
| HOST HC | ENCRYPTION PROTOCOL 2.0 ENCRYPTION PROTOCOL 1.0 |
| HOST HD | ENCRYPTION PROTOCOL 2.0 ENCRYPTION PROTOCOL 1.0 |

FIG. 3 (d) DEVICE INFORMATION STORING SECTION

| STORAGE NAME | AVAILABLE PRINTER | SECURITY LEVEL |
|---|---|---|
| STORAGE SA | PA | TOP SECRET |
| STORAGE SA | PB | HIGH |
| STORAGE SB | PA, PB, PC | MEDIUM |
| STORAGE SC | PA, PB, PC, PD | LOW |

FIG. 4 (a) SECURITY LEVEL: HIGH
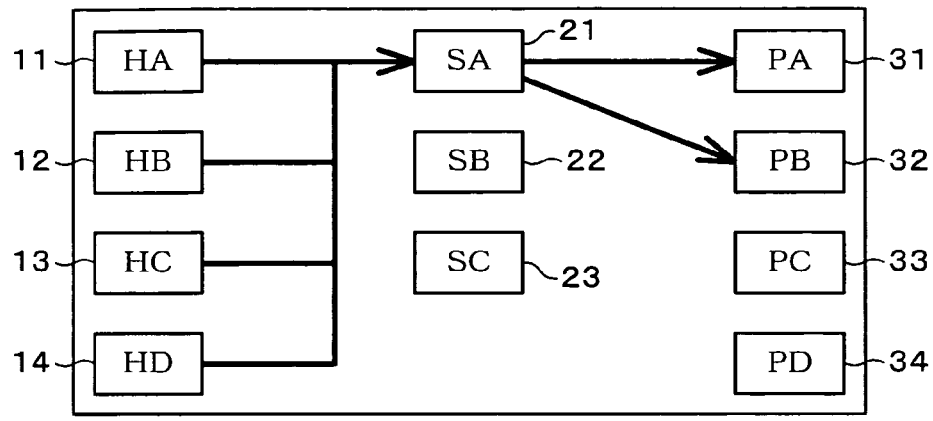
FIG. 4 (b) SECURITY LEVEL: MEDIUM
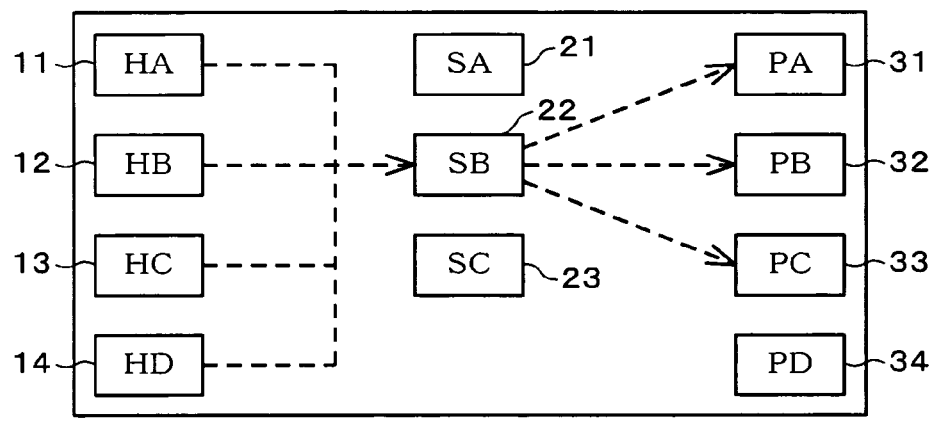
FIG. 4 (c) SECURITY LEVEL: LOW
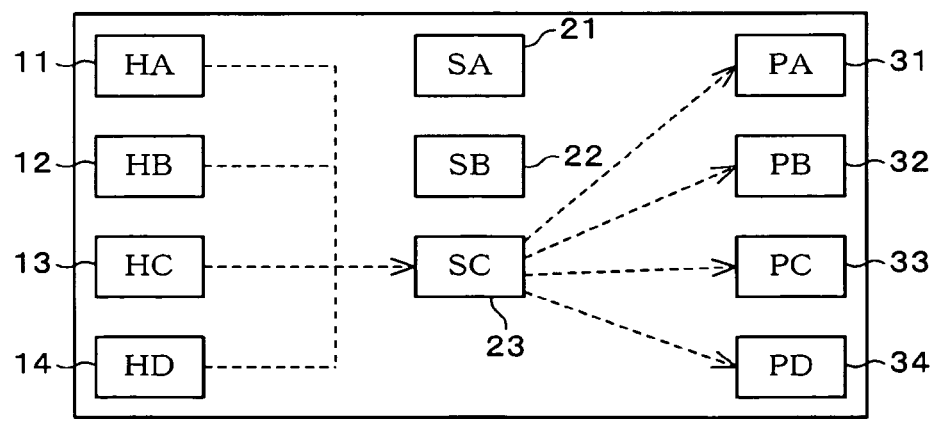

FIG. 6 (a)

| SELECT A SEARCH CATOGORY |
|---|
| PRINTER     STORAGE     SECURITY |

FIG. 6 (b)

| SELECT A SECURITY LEVEL |
|---|
| HIGH     MEDIUM     LOW |

FIG. 6 (c)

SECURITY LEVEL: HIGH
STORAGE SEARCHED
SELECT A STORAGE. AVAILABLE PRINTER WILL BE SEARCHED

| | STORAGE NAME | FEE |
|---|---|---|
| 1 | STORAGE SA | 200 YEN |
| 2 | STORAGE SD | 150 YEN |
| 3 | STORAGE SG | 200 YEN |

NARROW DOWN STORAGES

PRINTER CONDITIONS

FIG. 6 (d)

SECURITY LEVEL: HIGH
PRINT LOCATION : NARA PREFECTURE
PRINT JOB AVAILABLE FROM THE PRINTERS BELOW

| | PRINTER NAME | LOCATION | PRINTER FUNCTION |
|---|---|---|---|
| STORAGE SA | PRINTER PA | CONVENIENCE STORE A | COLOR PRINTING, DOUBLE-SIDED PRINTING |
| | PRINTER PB | CONVENIENCE STORE B | DOUBLE-SIDED PRINTING, STAPLING |

OK     RETURN     START OVER

FIG. 8 (a)

SELECT A SEARCH CATOGORY

[ PRINTER ]  [ STORAGE ]  [ SECURITY ]

FIG. 8 (b)

SELECT A SEARCH CONDITION

[ ADDRESS ]  [ FUNCTION ]  [ LIST ]

FIG. 8 (c)

ADDRESS: NARA PREFECTURE
PRINTER SEARCHED
SELECT A PRINTER. STORAGE CONTANING PRINT DATA FOR THE PRINTER WILL BE SEARCHED

|   | PRINTER NAME | LOCATION | PRINTER FUNCTION | SECURITY |
|---|---|---|---|---|
| 1 | PRINTER PA | CONVENIENCE STORE A | COLOR PRINTING, DOUBLE-SIDED PRINTING | TOP SECRET · HIGH · MEDIUM · LOW |
| 2 | PRINTER PB | CONVENIENCE STORE B | DOUBLE-SIDED PRINTING, STAPLING | HIGH · MEDIUM · LOW |
| 3 | PRINTER PC | CONVENIENCE STORE C | COLOR PRINTING, DOUBLE-SIDED PRINTING, STAPLING | MEDIUM · LOW |
| 4 | PRINTER PD | CONVENIENCE STORE D | DOUBLE-SIDED PRINTING, STAPLING | LOW |

[ DIRECTLY OUTPUT TO PRINTER ]  [ OUTPUT TO STORAGE ]  [ RETURN ]  [ START OVER ]

FIG. 8 (d)

AVAILABLE SOTRAGES TO PRINTER PA
SELECT A STORAGE

|   | STORAGE NAME | SECURITY LEVEL | FEE |
|---|---|---|---|
| 1 | STORAGE SA | HIGH (TOP SECRET) | 200 YEN |
| 2 | STORAGE SB | MEDIUM | 100 YEN |
| 3 | STORAGE SC | LOW | FREE |

[ OK ]  [ RETURN ]  [ START OVER ]

FIG. 10 (a)

SELECT A SEARCH CATOGORY

[ PRINTER ]  [ STORAGE ]  [ SECURITY ]

FIG. 10 (b)

SELECT A SEARCH CONDITION

[ NAME ]  [ SECURITY ]  [ LIST ]

FIG. 10 (c)

STORAGE SC SEARCHED

| | STORAGE NAME | AVAILABLE PRINTERS | SECURITY | FEE |
|---|---|---|---|---|
| 1 | STORAGE SC | PRINTER PA<br>PRINTER PB<br>PRINTER PC<br>PRINTER PD | LOW | FREE |

SECURITY LEVEL IS LOW

STORAGE WITH HIGH SECURITY LEVEL IS RECOMMENDED FOR HIGHLY SECRET DATA

[ OK ]  [ RETURN ]  [ START OVER ]  [ DETAILS OF PRINTER ]

FIG. 10 (d)

STORAGE SA SEARCHED

| | STORAGE NAME | AVAILABLE PRINTERS | SECURITY | FEE |
|---|---|---|---|---|
| 1 | STORAGE SA | PRINTER PA | TOP SECRET | 200 YEN |
| | | PRINTER PB | HIGH | |

[ OK ]  [ RETURN ]  [ START OVER ]  [ DETAILS OF PRINTER ]

FIG. 13 (a) HOST INFORMATION STORING SECTION

| HOST NAME | AVAILABLE STORAGE | LOCATION |
|---|---|---|
| HOST HA | INTRANET | COMPANY A HEADQUARTERS |
| HOST HB | INTRANET INTERNET | COMPANY A TOKYO BRANCH |
| HOST HC | INTERNET STORAGE SB | INTERNET A |
| HOST HD | INTERNET | INTERNET B |

FIG. 13 (b) PRINTER INFORMATION STORING SECTION

| PRINTER NAME | AVAILABLE STORAGE | LOCATION | FUNCITON |
|---|---|---|---|
| PRINTER PA | INTRANET | COMPANY A HEADQUARTERS | COLOR PRINTING, DOUBLE-SIDED PRINTING |
| PRINTER PB | INTRANET INTERNET | COMPANY A TOKYO BRANCH | DOUBLE-SIDED PRINTING, STAPLING |
| PRINTER PC | INTERNET STORAGE SB | CONVENIENCE STORE A | COLOR PRINTING, DOUBLE-SIDED PRINTING, STAPLING |
| PRINTER PD | INTERNET | CONVENIENCE STORE B | COLOR PRINTING |

FIG. 13 (c) STORAGE INFORMATION STORING SECTION

| STORAGE NAME | AVAILABLE HOST | AVAILABLE PRINTER | LOCATION |
|---|---|---|---|
| STORAGE SA | INTRANET | INTRANET | COMPANY A HEADQUARTERS |
| STORAGE SB | INTRANET HOST HC | INTRANET PRINTER PC | COMPANY A TOKYO BRANCH |
| STORAGE SC | INTERNET | INTERNET | INTERNET A |

FIG. 13 (d) DEVICE INFORMATION STORING SECTION

| STORAGE NAME | AVAILABLE HOST | AVAILABLE PRINTER | SECURITY LEVEL |
|---|---|---|---|
| STORAGE SA | HA, HB | PA, PB | HIGH |
| STORAGE SB | HA, HB, HC | PA, PB, PC | MEDIUM |
| STORAGE SC | HB, HC, HD | PC, PD | LOW |

FIG. 16 (a) STORAGE INFORMATION STORING SECTION

| STORAGE NAME | STORAGE FEE | DATA PROTECTION FUNCTION (LEVEL) | |
|---|---|---|---|
| STORAGE SA | 200 YEN | ONLY ENCRYPTION PROTOCOL 2.0 ENCRYPTION STORAGE | HIGH (TOP SECRET) |
| STORAGE SB | 100 YEN | ONLY ENCRYPTION PROTOCOL 1.0 | MEDIUM |
| STORAGE SC | FREE | — | LOW |

FIG. 16 (b) SCANNER INFORMATION STORING SECTION

| SCANNER NAME | DATA PROTECTION FUNCTION (LEVEL) | | LOCATION | SCANNER FUNCTION |
|---|---|---|---|---|
| SCANNER ScA | ENCRYPTION PROTOCOL 2.0 ENCRYPTION PROTOCOL 1.0 DATA ENCRYPTION | TOP SECRET | CONVENIENCE STORE A | COLOR PRINTING: 2400dpi |
| SCANNER ScB | ENCRYPTION PROTOCOL 2.0 ENCRYPTION PROTOCOL 1.0 | HIGH | CONVENIENCE STORE B | COLOR PRINTING: 2400dpi |
| SCANNER ScC | ENCRYPTION PROTOCOL 1.0 | MEDIUM | CONVENIENCE STORE C | COLOR PRINTING: 1200dpi |
| SCANNER ScD | — | LOW | CONVENIENCE STORE D | BLACK-AND-WHITE PRINTING: 600dpi |

FIG. 16 (c) HOST INFORMATION STORING SECTION

| HOST NAME | DATA PROTECTION FUNCTION | DATA ENCRYPTION/DECRYPTION FUNCTION |
|---|---|---|
| HOST HA | ENCRYPTION PROTOCOL 2.0 ENCRYPTION PROTOCOL 1.0 | PRESENT |
| HOST HB | ENCRYPTION PROTOCOL 2.0 ENCRYPTION PROTOCOL 1.0 | ABSENT |
| HOST HC | ENCRYPTION PROTOCOL 1.0 | PRESENT |
| HOST HD | — | ABSENT |

FIG. 16 (d) DEVICE INFORMATION STORING SECTION

| ROUTE | ENCRYPTION PROTOCOL | DATA ENCRYPTION | SECURITY LEVEL |
|---|---|---|---|
| ScA→SA→HA | 2.0 | PRESENT | TOP SECRET |
| ScA, ScB→SA→HA, HB | 2.0 | ABSENT | HIGH |
| ScA→SB→HA, HC | 1.0 | PRESENT | HIGH |
| ScA, ScB, ScC →SB →HA, HB, HC | 1.0 | ABSENT | MEDIUM |
| ScA→SC→HA, HC | ABSENT | PRESENT | MEDIUM |
| ScA, ScB, ScC, ScD →SC →HA, HB, HC, HA | ABSENT | ABSENT | LOW |

FIG. 17 (a) SECURITY LEVEL: TOP SECRET
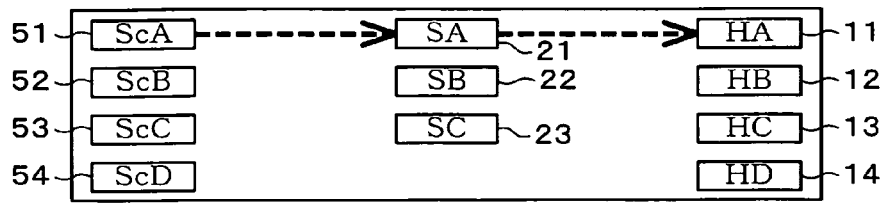
FIG. 17 (b) SECURITY LEVEL: HIGH-1
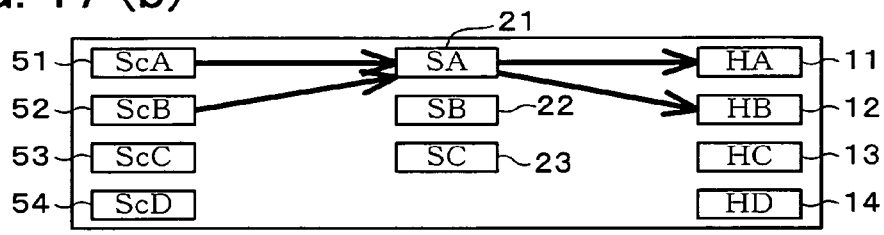
FIG. 17 (c) SECURITY LEVEL: HIGH-2
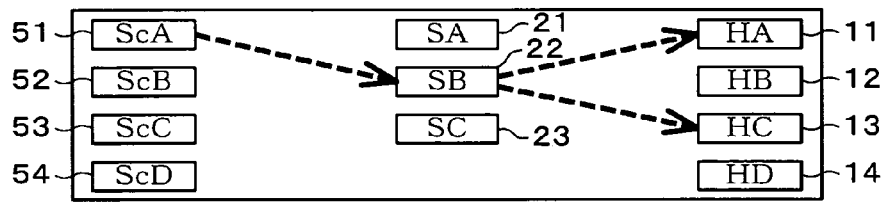
FIG. 17 (d) SECURITY LEVEL: MEDIUM-1
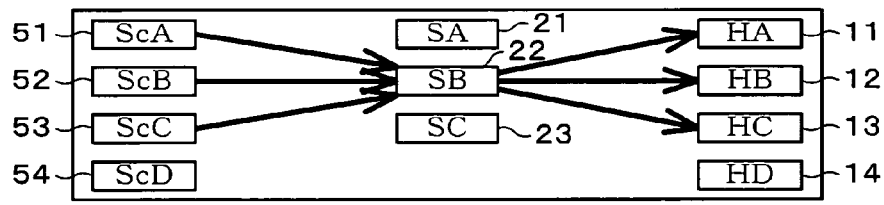
FIG. 17 (e) SECURITY LEVEL: MEDIUM-2
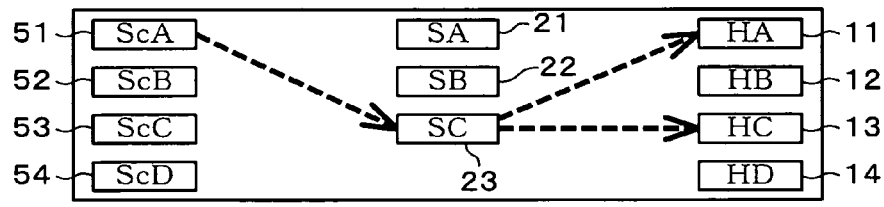
FIG. 17 (f) SECURITY LEVEL: LOW
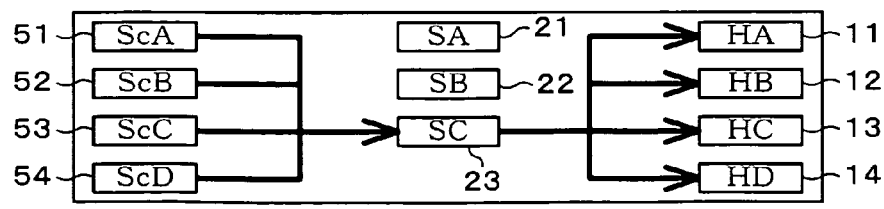

ELECTRONIC DEVICE NETWORK SYSTEM AND DATA RECEIVER SEARCH METHOD USING ELECTRONIC DEVICE NETWORK SYSTEM

This Nonprovisional application claims priority under 35 U.S.C. §119(a) on Patent Application No. 2003/020937 filed in Japan on Jan. 29, 2003, the entire contents of which are hereby incorporated by reference.

FIELD OF THE INVENTION

The present invention relates to electronic device network systems in which data is transmitted from one electronic device to another for data output in a network of electronic devices. The invention also relates to data receiver search methods using such electronic device network systems.

BACKGROUND OF THE INVENTION

With the rapid advancement of information processing devices and Internet environment, there has been ongoing development of OA devices that use not only conventional techniques for LAN environment but also various techniques for the Internet.

Such OA devices may be used not only individually but also in combination by combining their functions. The OA devices may be external devices for computer apparatuses, or may be computer apparatuses used as external devices. That is, such OA devices are now regarded as advanced information processing devices for providing services in supporting office work.

With the advancement of information processing devices as above, new integrative interface specifications known as BMLinkS® was developed by the OA System Devices Committee in May of 1998.

In a printing system under BMLinkS® standards, a host computer transmits print data to a storage server and stores the print data therein, and the stored print data in the storage server is transmitted to a printer for a print job.

In another printing system in which information processing devices and printers are disposed at discrete locations on a network, a search is made for a printer that outputs print data, so that the print data can be transmitted to the printer for a print job, as disclosed in Japanese Unexamined Publication for Patent Application No. 214872/1995 (Tokukaihei 07-214872; published on Aug. 15, 1995) ("Publication 1" hereinafter).

In the printing system disclosed in Publication 1, a search is made for a function (paper size, double-sided printing, sorting, etc.) and/or a format (bitmap, printer language, etc.) that are suitable for a print job, so that the print job can be carried out according to these functions and formats.

With the rapid spreading of networks and the Internet, printing systems as disclosed in Publication 1 are highly convenient and have many applications.

However, the printing system disclosed in Publication 1 does not take into account protection (security) of print data. Thus, the printing system is prone to data leakage in printing secret documents, imposing limitations on its applications.

In light of the problem of print data leakage, there have been proposed printing systems in which password is entered to output or delete print data, as disclosed in Japanese Unexamined Publication for Patent Application No. 021022/1998 (Tokukaihei 10-021022; published on Jan. 23, 1998) ("Publication 2" hereinafter), and No. 301058/1999 (Tokukaihei 11-301058; published on Nov. 2, 1999) ("Publication 3" hereinafter).

For example, the data output control system disclosed in Publication 2 solves the problem of data leakage by providing a security print mode in which a printer server is prevented from outputting print data to a printer unless an ID or password is verified in the print server.

While this ensures security by causing users to enter an ID or password, use of printers in the security print mode is prohibited for users who do not know the ID or password.

SUMMARY OF THE INVENTION

The present invention was made in view of the foregoing problem, and it is an object of the present invention to provide an electronic device network system that allows a user to transmit data through a transmission route according to a user's desired security level, and to provide a data receiver search method using such an electronic device network system, taking into account protection (security) of data between electronic devices in a network.

In order to achieve the foregoing object, an electronic device network system of the present invention includes: an electronic device for transmitting data via a network; a plurality of storing means for storing data transmitted from the electronic device; and a plurality of external devices for acquiring data from the storing means and processing the acquired data, the network connecting the electronic device, the storing means, and the external devices to one another, wherein the electronic device, at least one of the plurality of storing means, and at least one of the external devices each have a security function.

With this structure, in transmitting data from an electronic device to an external device via a storing means, a user selects a storing means and external device that have security functions corresponding to a user's desired security level, thereby safely and conveniently transmitting data to the storing means and external device.

That is, the electronic device network system of the present invention is a network system connecting an electronic device, a plurality of storing means for storing various data, and a plurality of external devices for acquiring the stored data in the storing means and processing the acquired data. The electronic device network system complies with the BMLinkS® standards, for example.

The electronic device is realized by a host PC or scanner, for example, and transmits data to a storing means and external device via a network.

The storing means is realized, for example, by a storage server in a network. A plurality of storage servers have different security levels.

The external device is realized, for example, by a printer or MFP (Multi-Function Printer), and processes the transmitted data.

In the electronic device network system of the present invention, a security function is rendered to the electronic device, at least one of the storing means, and at least one of the external devices.

For example, the security function may be an encryption protocol used in data communications, or it may be realized by a network combining an intranet and the Internet. The security level may be tiered into three levels 0, 1, and 2, for example. Note that, as the term is used herein, security level is 0 when data is transmitted and received without taking into account data security.

This enables a user to set a security level according to the importance of transmitted data. Based on the security level so set, the user is able to search for a data transmission route to an external device, thereby safely and securely transmitting the data to a desired storing means or external device.

For example, when the user wishes to transmit important data, the data is transmitted through a data transmission route that combines a storing means of a high security level and an external device of a security level that enables the data to be acquired from the storing means of a high security level and to be outputted. This solves the problem of data leakage to a third party.

Thus, in order to safely transmit important data, the user simply selects a storing means and external device of a desired security level without entering an ID or password. As a result, an electronic device network system is realized that ensures data safety.

As the term is used herein, "security function" refers to a data protecting function for preventing unauthorized access to data in a network so as to protect the data contents (document, image, etc.). Examples of security functions include:
unauthorized access preventing function for preventing:
unauthorized access to a network;
unauthorized access to a device (electronic device, storing means, external device) on a network; and
unauthorized access to predetermined data stored in a device (electronic device, storing means, external device) on a network;
tampering preventing function for preventing tampering of data by an unauthorized user;
leakage preventing function for preventing unauthorized reading of data by an unauthorized user; and
data protecting function for preventing data from being destroyed or made unusable.

It is preferable that the leakage preventing function is rendered to the electronic device, at least one of the storing means, and at least one of the external devices. It is particularly preferable that these devices and means have a function of transmitting and receiving encrypted data.

In order to achieve the foregoing object, the present invention provides a data receiver search method using an electronic device network system that includes: an electronic device for transmitting data via a network; a plurality of storing means for storing data transmitted from the electronic device; and a plurality of external devices for acquiring data from the storing means and processing the acquired data, the network connecting the electronic device, the storing means, and the external devices to one another, and the electronic device, at least one of the plurality of storing means, and at least one of the external devices each having a security function, the method searching for a storing means and an external device whose respective security functions match a security level set by a user, when the electronic device transmits data.

In an electronic device network system that complies with the BMLinkS® or other specifications in which a plurality of electronic devices, storing means, and external devices are disposed at discrete locations on a network, the method searches for a storing means and external device that are suitable for a user's desired security level, thereby enabling a user to search a plurality of storing means and external devices and find therefrom a storing means and external device that can be used to safely transmit data.

Thus, in order to safely transmit important data, the user simply selects a storing means and external device of a desired security level without entering an ID or password. As a result, an electronic device network system is realized that ensures data safety.

In order to achieve the foregoing object, a data receiver search system of the present invention includes: a plurality of storing means with different security levels for storing data; a plurality of external devices for acquiring data from the storing means and processing the acquired data; an electronic device connected to the storing means and the external devices via a network; and a search device, connected to the electronic device, for searching for a storing means that satisfies a predetermined condition, the electronic device including: a transmission section for transmitting data to the storing means; and a setting section for enabling a user to set a security level for transmitted data, the search device including a search section for searching for a storing means according to the security level set in the setting section, so that the transmitted data is received by the storing means so searched.

Thus, a user only needs to set a security level according to the importance of transmitted data in order to search the network for a storing means whose security level correspond to a user's desired security level. The user is therefore able to transmit data on a route that includes a storing means whose security function satisfies the user's desired security level.

For a fuller understanding of the nature and advantages of the invention, reference should be made to the ensuing detailed description taken in conjunction with the accompanying drawings.

BRIEF DESCRIPTION OF THE DRAWINGS

FIG. 3(*a*) through FIG. 3(*d*) are views illustrating the contents of stored data in respective information storing sections of the host PC, the storage, the printer, and the search server.

FIG. 4(*a*) through FIG. 4(*c*) are block diagrams illustrating data transmission routes for different security levels.

FIG. 6(*a*) through FIG. 6(*d*) are views illustrating the display contents displayed by the host PC when print data is outputted according to the method in the flowchart of FIG. 5.

FIG. 8(*a*) through FIG. 8(*d*) are views illustrating the display contents displayed by the host PC when print data is outputted according to the method in the flowchart of FIG. 7.

FIG. 10(*a*) through FIG. 10(*d*) are views illustrating the display contents displayed by the host PC when print data is outputted according to the method in the flowchart of FIG. 9.

FIG. 13(a) through FIG. 13(d) are views illustrating the contents of stored data in respective information storing sections of the host PC, the storage, the printer, and the search server.

FIG. 16(a) through FIG. 16(d) are views illustrating the contents of stored data in respective information storing sections of the host PC, the storage, the printer, and the search server.

FIG. 17(a) through FIG. 17(f) are block diagrams illustrating transmission routes of print data according to security level.

DESCRIPTION OF THE EMBODIMENTS

First Embodiment

Referring to FIG. 1 through FIG. 11, the following will describe a printing system according to an electronic device network system and a data receiver search method using the electronic device network system in one embodiment of the present invention.

The printing system of the present embodiment includes a plurality of host PCs (electronic devices), a plurality of storages (storing means), and a plurality of printers (external devices), which are connected to one another through the Internet.

Figure 2:
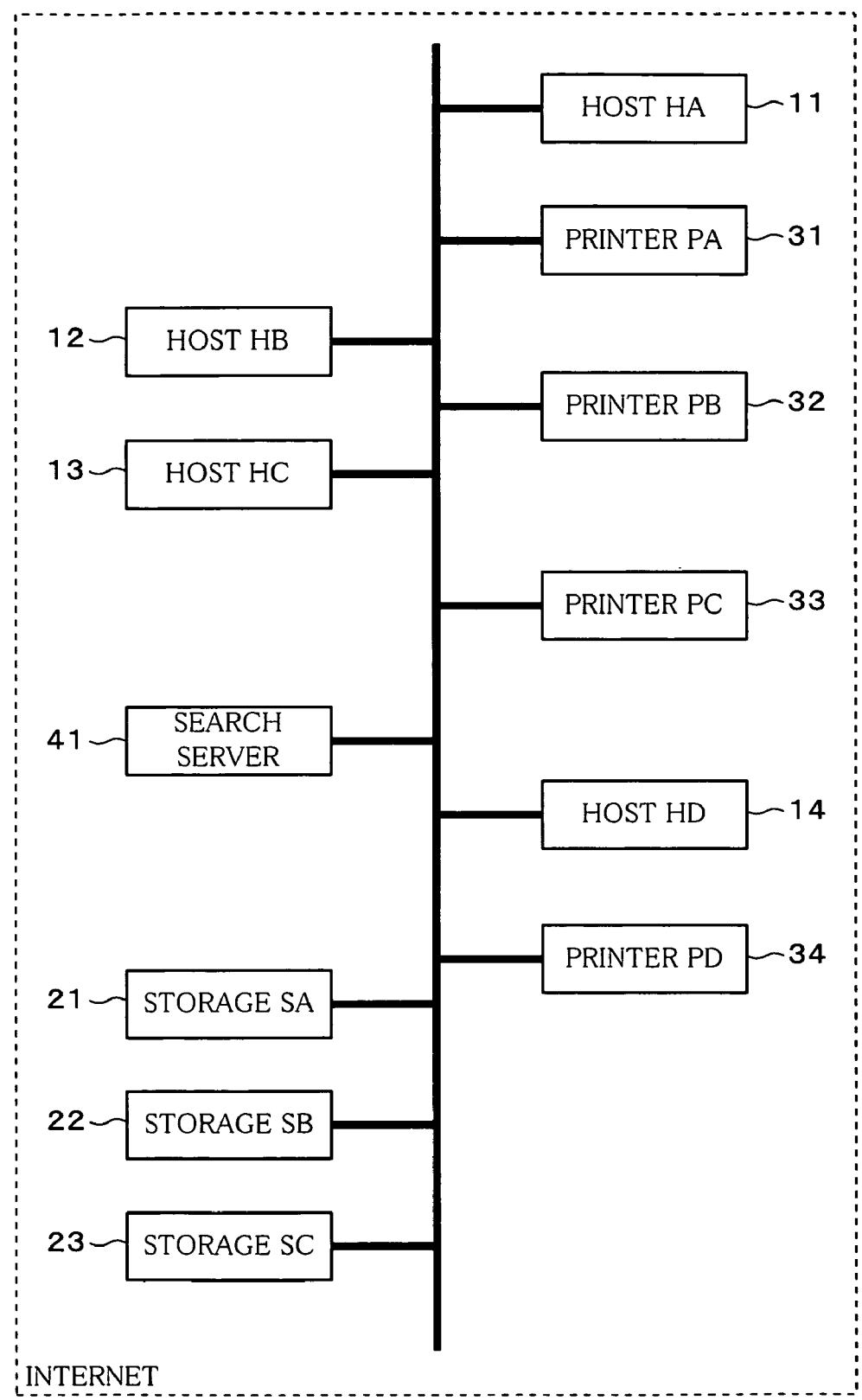
FIG. 2 is a block diagram illustrating a schematic structure of the printing system shown in FIG. 1.

Specifically, as shown in FIG. 2, the printing system includes four host PCs (host HA11, host HB12, host HC13, and host HD14), three storages (storage SA21, storage SB22, and storage SC23), four printers (printer PA31, printer PB32, printer PC33, and printer PD34), and a search server (search means, search device) 41.

The host PCs 11 through 14 are realized by common computers, for example, such as a personal computer and workstation, and are used to transmit print data to the printers 31 through 34.

The storages 21 through 23 are for storing various data transmitted from the host PCs 11 through 14. In the present embodiment, the storages 21 through 23 are used to temporarily store the print data transmitted from the host PCs 11 through 14. The storages 21 through 23 also output the stored print data to the printers 31 through 34, as required.

The printers 31 through 34 output the print data transmitted from the storages 21 through 23, or that directly transmitted from the host PCs 11 through 14. That is, the printers 31 through 34 carry out a print job.

The search server 41 searches the storages 21 through 23 or the printers 31 through 34 for a necessary storage or printer. The search is made according to various functions of the storages 21 through 23 and printers 31 through 34. For example, for a print job of data requiring double-sided printing, the search server 41 searches the printers 31 through 34 for a printer with a double-sided printing function. The search server 41 is also able to search the storages 21 through 23 and the printers 31 through 34 according to their security levels.

Next, description is made below as to the security function rendered to each of the host PCs 11 through 14, each of the storages 21 through 23, and each of the printers 31 through 34.

In the printing system of the present embodiment, three kinds of data protecting functions, "encryption protocol 2.0," "encryption protocol 1.0," and "no encryption protocol" are rendered to each of the host PCs 11 through 14, each of the storages 21 through 23, and each of the printers 31 through 34. With these data protecting functions, three security levels "high," "medium," and "low" are realized.

The cryptosystem used here may be a common key cryptosystem, a public key cryptosystem, or a hybrid of these cryptosystems. Among these cryptosystems, the hybrid cryptosystem is most preferable, in which data is encrypted by a common key cryptosystem and is sent after a common key is encrypted by a public key cryptosystem, as in the SSL protocol.

Note that, the encryption protocol is not the only way to render the security functions. For example, the security functions may be rendered by combining an intranet and the Internet, as will be described in the Second Embodiment, or by encrypting data using encrypting means before it is transmitted, as will be described in the Third Embodiment.

Figure 1:
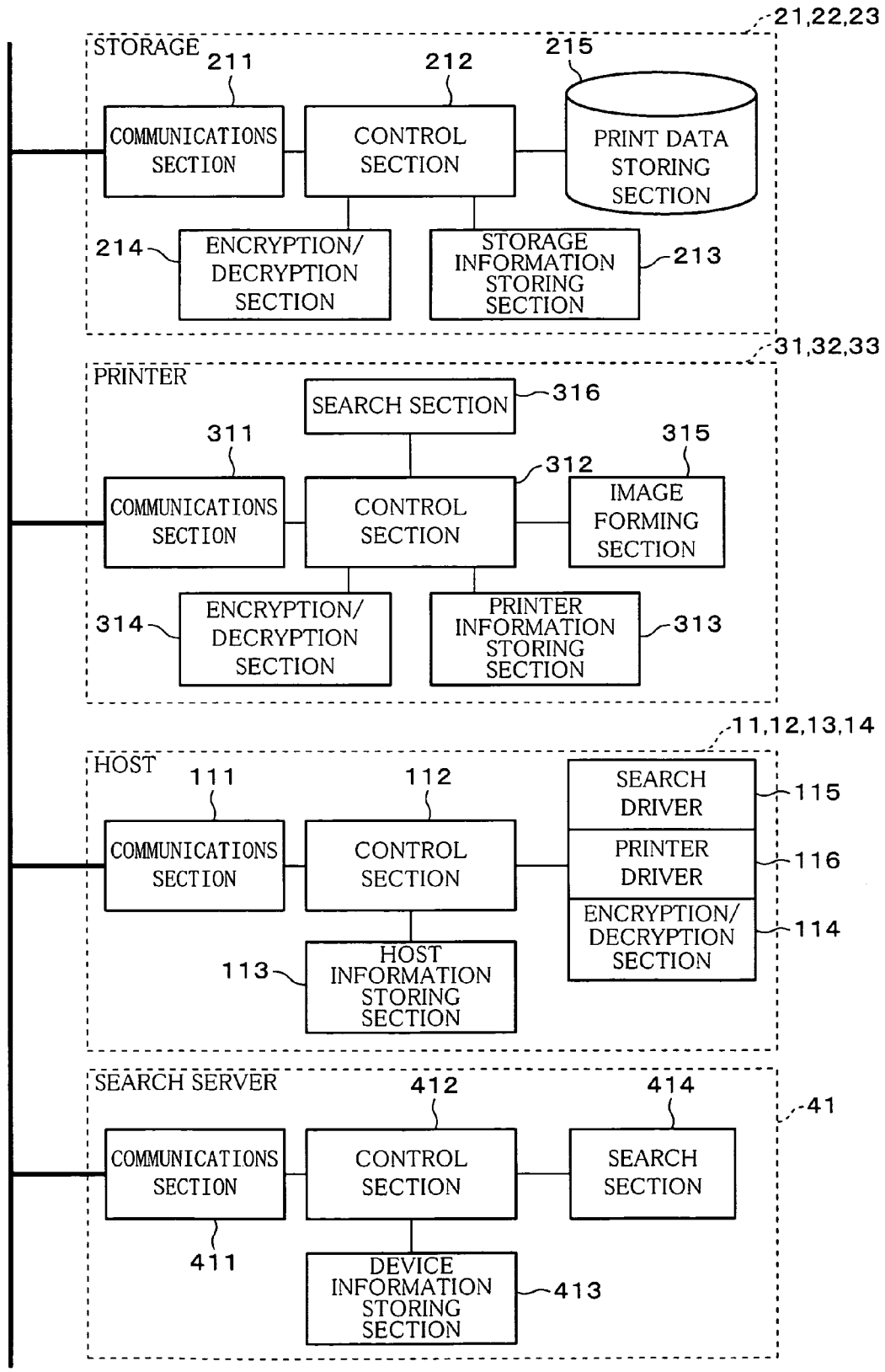
FIG. 1 is a block diagram illustrating structures of a host PC, a storage, a printer, and a search server in a printing system according to one embodiment of the present invention.

Referring to FIG. 1, the following more specifically describes the host PCs 11 through 14, the storages 21 through 23, the printers 31 through 34, and the search server 41 in regard to their structures.

As illustrated in FIG. 1, the storages 21 through 23 each include a communications section 211, a control section 212, a storage information storing section 213, an encryption/decryption section 214, and a print data storing section 215.

The communications section 211 is an interface for sending and receiving data to and from the external devices.

The control section 212 is a central unit, controlling the entire device.

The storage information storing section 213 stores storage information, examples of which include security level and user fee. The information stored in the storage information storing section 213 may be displayed using display means (not shown) to enable a user to confirm the stored information.

The encryption/decryption section 214 protects the stored print data in the storages 21 through 23. Specifically, the encryption/decryption section 214 carries out an encryption process so that the transmitted data from the host PCs 11 through 14 are not easily read out by a third party. The encryption/decryption section 214 also carries out a decryption process for decrypting the encrypted print data into a readable form.

The print data storing section 215 stores the print data processed by the encryption/decryption section 214.

The printers 31 through 34 each include a communications section 311, a control section 312, a printer information storing section 313, an encryption/decryption section 314, an image forming section 315, and a search section 316.

The communications section 311 is an interface for sending and receiving data in and from the external devices.

The control section is a central unit, controlling the entire device.

The printer information storing section 313 stores the printer information (for example, security level, printer function) characterizing the printer. The information stored in the printer information storing section 313 may be displayed using display means (not shown) to enable a user to confirm the stored information.

The encryption/decryption section 314, as with the encryption/decryption section 214 of the storages 21 through 23, carries out an encryption process for the print data, and a decryption process for decrypting the encrypted print data into a readable form.

The image forming section 315 develops an image from the print data decrypted by the encryption/decryption section 314.

The search section 316 searches for a storage that contains data to be processed by the printer.

The host PCs 11 through 14 each include a communications section (transmitting section) 111, a control section 112, a host information storing section 113, an encryption/decryption section 114, a search driver 115, and a printer driver 116.

The communications section 111 is an interface for sending and receiving data in and from the external devices.

The control section 112 is a central unit, controlling the entire device.

The host information storing section 113 stores host information, such as security level, characterizing the host PC. Note that, the information stored in the host information storing section 113 may be displayed using display means (not shown) to enable a user to confirm the stored information.

The encryption/decryption section 114, as with the encryption/decryption sections 213 and 214, carries out an encryption process for print data, and a decryption process for decrypting the encrypted print data into a readable form.

The search driver 115 is driving means for driving the search server 41. Using the search server 41, the search driver 115 searches the host PCs 11 through 14 for a desired host PC. With the search driver 115, the setting section for enabling a user to set a security level is realized on software. That is, the search driver 115 causes a computer (not shown) to operate as the setting section. Another function of the search driver 115 is to command the search server 41 to search for a device whose security level satisfies a user's desired security level.

Using applications installed in the host PCs 11 through 14, the printer driver 116 causes user data to be converted into print data for respective printers, or causes a target printer to carry out a print job under desired print conditions (the number of copies, paper size, etc.). The printer driver 116 also serves to cause print data (print job) to be stored in the storages 21 through 23.

The search server 41 includes a communications section 411, a control section 412, a device information storing section 413, and a search section 414.

The communications section 411 is an interface for sending and receiving data in and from the external devices.

The control section 412 is a central unit, controlling the entire device.

The device information storing section 413 stores information concerning all devices on the network, including, for example, security levels of the printers and storages, and print functions of the printers. The information stored in the device information storing section 413 may be displayed using a display section (not shown) of the host PC to enable a user to confirm the stored information.

The search section 414 searches the host PCs 11 through 14, the storages 21 through 23, or the printers 31 through 34 according to the search conditions specified by a user, so that a device (host PC, storage, or printer) with a user's desired security level is found based on the device information acquired from the respective devices on the network and stored in the device information storing section 413.

FIG. 3(a) through FIG. 3(d) show types of information stored in the respective information storing sections 113, 213, 313, and 413 of the storages 21 through 23, the printers 31 through 34, the host PCs 11 through 14, and the search server 41.

The storage information storing section 213 provided in each of the storages 21 through 23 stores information including "storage name," "storage fee," and "security level (data protecting functions)," as shown in FIG. 3(a).

In the storage SA21, security level is "high," and the encryption protocol level is 2.0, with which print data can be encrypted before it is transmitted. The storage SA21 also has a backup function that is turned on in times of server trouble.

In the storage SB22, security level is "medium," and the encryption protocol level is 1.0, with which print data can be encrypted before it is transmitted.

In the storage SC23, security level is "low," and there is no data protection.

That is, the printing system of the present embodiment provides three storages of different security levels for data protection.

As the term is used herein, security level is "high" when the storage offers high data protection safety in terms of both network and data itself. For example, the security level of a storage is "high" when it is connected only to devices (personal computers, printers, etc.) on an intranet in a company.

As the term is used herein, security level is "medium" when the storage offers high safety in terms of data itself but poses safety problems in terms of network. For example, the security level of a storage is "medium" when it is installed in a company but may be connected to external devices on the Internet.

As the term is used herein, the security level of a storage is "low" when the data protection safety involves some danger in terms of network and data itself. For example, the security level of a storage is "low" when it provides free access on the Internet.

Note that, as to a printing system with storages having security functions, more detailed description will be given in the Second Embodiment below in conjunction with its applications on an intranet, the Internet, and a combination of these networks.

As noted above, the storages 21 through 23 have different security levels. Accordingly, user fees are different for these different security levels. For example, user fees are priced 200 Yen, 100 Yen, and 0 Yen (free) in a descending order of security levels.

The printer information storing section 313 provided in each of the printers 31 through 34 stores information, including "printer name," "data protecting function" indicative of a security level of the printers 31 through 34, "location" where the printer is installed, and "print function" of the printer, as shown in FIG. 3(b).

The printer PA31 has encryption protocol levels 2.0 and 1.0. In addition, the printer PA31 has a decrypting function, so that the print data can be stocked and remain encrypted until it is printed. The security level is "top secret."

In the printer PB32 has encryption protocol levels 2.0 and 1.0, and the security level is "high."

In the printer PC33, the encryption protocol level is 1.0, and the security level is "medium."

The printer PD34 offers no data protection, and the security level is "low."

As noted above, the information stored in the printer information storing section 313 includes "location" where the printer is installed, and "print function" of the printer, such as color printing, double-sided printing, and stapling. These information may be displayed in a display section (not shown) of the printer, or may be confirmed at the host PC via the search server 41.

The host information storing section 113 provided in each of the host PCs 11 through 14 stores information, including "host name," and "data protecting function" indicative of a security level of the host PCs 11 through 14, as shown in FIG. 3(*c*).

In the present embodiment, the host PCs 11 through 14 all have encryption protocol levels 2.0 and 1.0, so that the print data can be encrypted before it is transmitted. Further, the host PCs 11 through 14 can accommodate any of the security levels "high," "medium," and "low."

The device information storing section 413 of the search server 41 stores information including "storage name," "available printer," and "security level."

The information stored in the search server 41 may be acquired by gathering printer information from the printers 31 through 34, and storage information from the storages 21 through 23. Alternatively, the search server 41 may store information that has been created beforehand.

With the device information storing section 413 in the search server 41, the printing system of the present embodiment is able to select a device (storages 21 through 23, printers 31 through 34) according to the necessary security level for the print data.

The search server 41 may additionally be provided with a route search section (route search means) (not shown), which, according to the security level, searches print routes linking storages and printers as shown in FIG. 4(*a*) through FIG. 4(*c*).

For example, when the user's desired security level is "high" or higher ("high" or "top secret"), the search server 41 searches for a print route that links the storage SA21 with the printer PA31 or printer PB32, as shown in FIG. 4(*a*).

As another example, when the user's desired security level is "medium," the search server 41 searches for a print route that links the storage SB22 with the printer PA31, printer PB32, or printer PC33, as shown in FIG. 4(*b*).

Further, when the user's desired security level is "low," the search server 41 searches for a print route that links the storage SC23 with any one of the printers 31 through 34, as shown in FIG. 4(*c*).

In this manner, the printing system of the present embodiment enables an optimum transmission route to be easily searched according to the user's desired security level, thereby enabling the printers 31 through 34 to output the print data transmitted from the host PCs 11 through 14 by taking into account data protection security.

Figure 5:
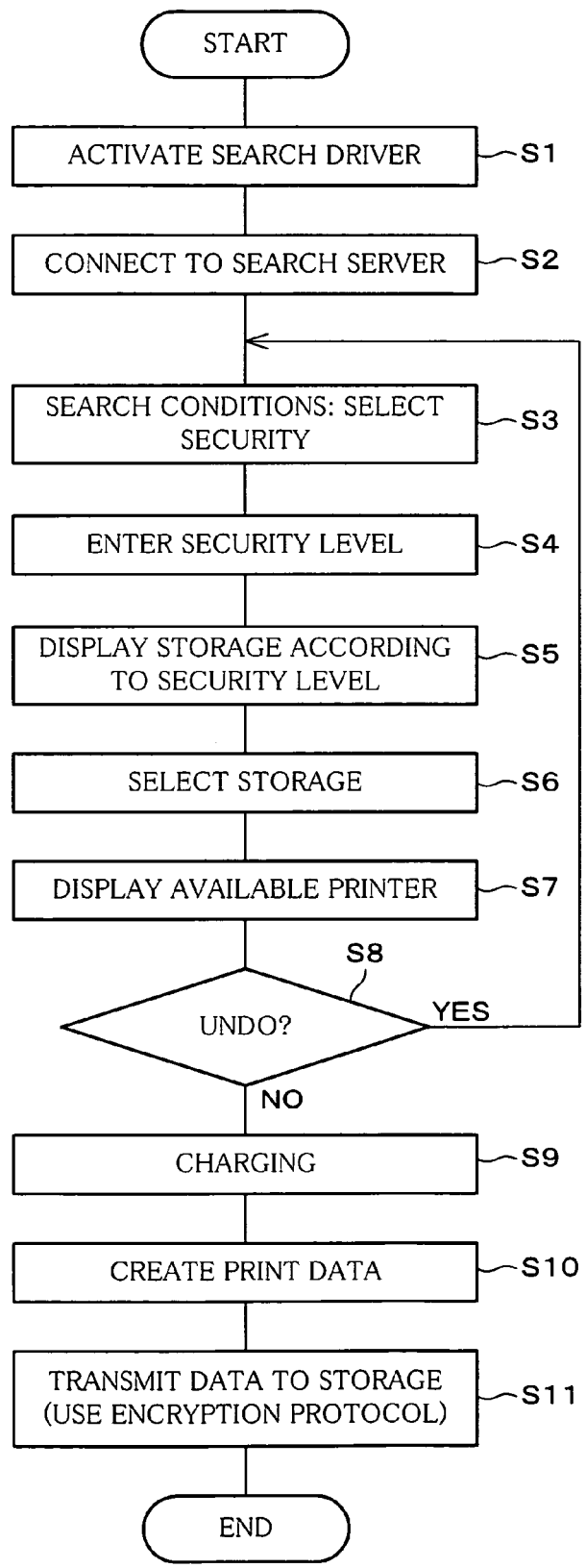
FIG. 5 is a flowchart representing procedures for searching for a transmission route of print data when the search is made by giving priority to security level in the printing system of FIG. 1.

Referring to FIG. 5 and FIG. 6(*a*) through FIG. 6(*d*), the following describes how print data are transmitted according to the security level in the printing system of the present embodiment.

FIG. 6(*a*) through FIG. 6(*d*) schematically illustrate displayed contents in the host PCS 11 through 14 during a print process.

To transmit print data from the host PCs 11 through 14, the search driver 115 of the host PCs 11 through 14 is activated in step S1 of the flowchart shown in FIG. 5. With the search driver 115 activated, the host PCs 11 through 14 are connected to the search server 41 in S2.

In response, the host PCs 11 through 14 carry out display as shown in FIG. 6(*a*), enabling a user to select a search category (search condition).

Here, if the user would like a search according to a security level, a "security" button is pressed in S3.

Then, the host PCs 11 through 14 carry out display as shown in FIG. 6(*b*), enabling the user to select a security level as he or she desires (security level for the print data). In the display shown in FIG. 6(*b*), a "high" security level is selected.

For example, when a "high" security level is selected in S4, a list of storages is displayed in S5 according to their security levels, as shown in FIG. 6(*c*).

In S6, the user selects one of the storages SA through SC in the display of FIG. 6(*c*). In the example of FIG. 6(*c*), storage SA is selected.

With a storage selected by the user in S6, available printers are displayed in S7 according to the selected storage and the security level, as shown in FIG. 6(*d*).

If the location and print functions of the available printers in the display do not meet the user demand, i.e., if Yes in S8, the sequence may be repeated from S3.

On the other hand, if the functions of the available printers meet the user demand, i.e., if No in S8, a storage fee is charged in S9 and print data is created in S10. In S11, the print data is transmitted to the selected storage using an encryption protocol.

In the printing system of the present embodiment, the print data is transmitted from the host PC to the storage in the manner described above. This enables the print data to be transmitted through a route according to the security level of the print data, thereby realizing a printing system that is safe to use in terms of data protection.

Figure 7:
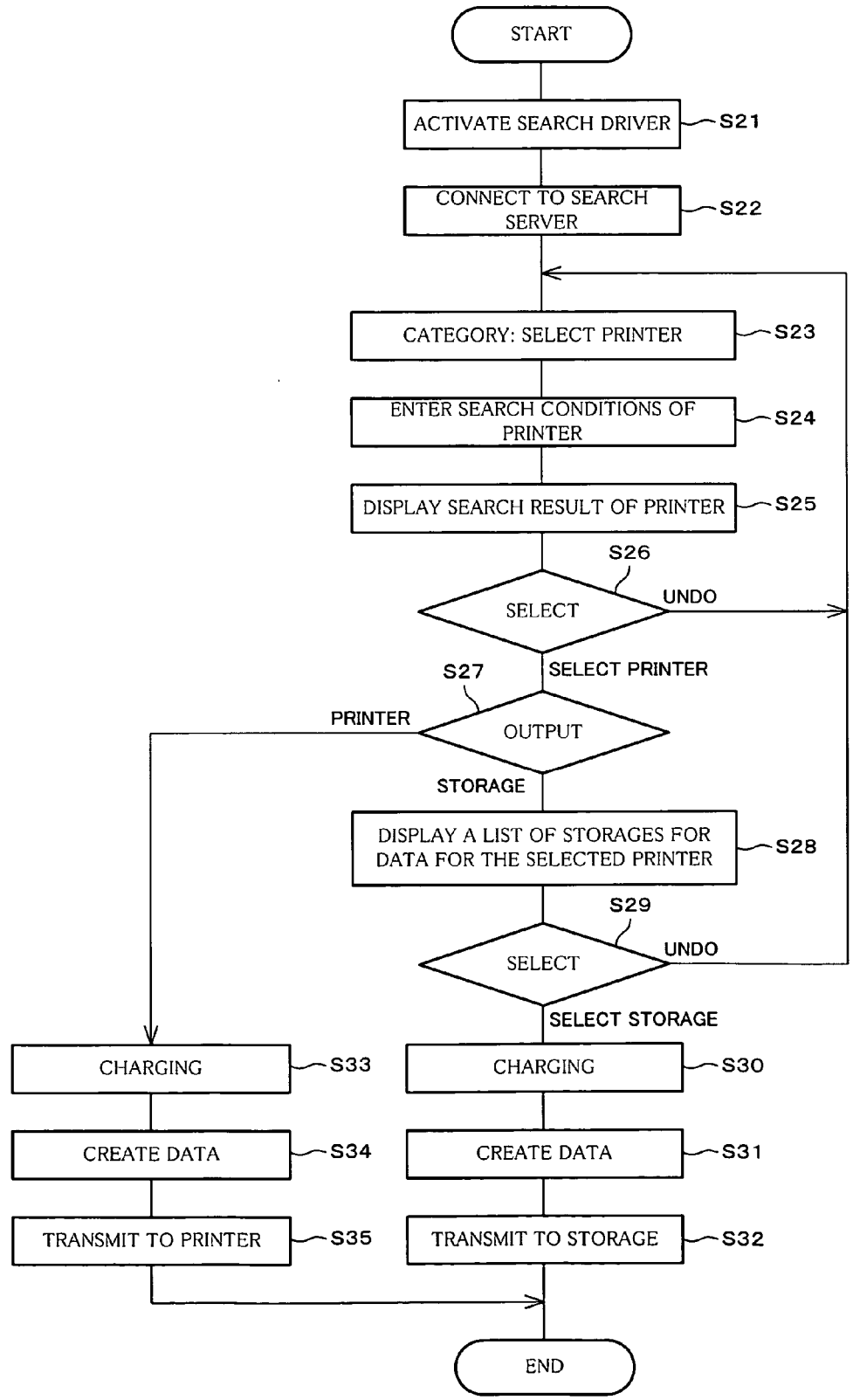
FIG. 7 is a flowchart representing procedures for searching for a transmission route of print data when the search is made by giving priority to printer in the printing system of FIG. 1.

Referring to the flowchart of FIG. 7, the following will describe how a transmission route of print data is determined by giving priority to the location of the printer used to output the print data, according to the printing system of the present embodiment.

In the transmission method of print data described above, a print route is determined by giving priority to the security level. In an alternative transmission method described below, a search for a print route linking printers and storages is made by giving priority to the location of the printer used to output the print data.

To transmit print data from the host PCs 11 through 14, the search driver 115 of the host PCs 11 through 14 is first activated in S21 of FIG. 7. With the search driver 115 activated, the host PCs 11 through 14 are connected to the search server 41 in S22.

In response, the host PCs 11 through 14 carry out display as shown in FIG. 8(*a*), enabling a user to select a search category (search condition). Here, if the user would like a search that prioritizes a printer used to output the print data, a "printer" button is pressed in S23.

Then, the host PCs 11 through 14 carry out display as shown in FIG. 8(*b*), enabling the user to enter search conditions in S24, including the location and function of the printers, for example. In the display shown in FIG. 8(*b*), printer location (address) is selected.

For example, when the printer location (address) selected by a user is "Nara" prefecture, a list of printers located in Nara prefecture is displayed in S25, as shown in FIG. 8(*c*). In addition to the printer locations, the list also displays print functions and security levels of the respective printers.

From the list, the user in S26 selects a printer of a desired location and with print functions and a security level that fulfill the print data. Note that, when the list does not contain a printer that meets the user demand in S26, the sequence may return to S23 to select a search category again and start over the process.

With a printer selected in S26, an output process of the print data is carried out in S27. The output process of S27 is carried out by either one of the following two methods. In the first method, the print data is transmitted and outputted from the printers 31 through 34 after once stored in the storages 21 through 23. In the second method, the print data is directly transmitted and outputted from the printers 31 through 34 by bypassing the storages 21 through 23.

Among these two methods, the second method is described first in which the print data is directly transmitted and outputted from the printers 31 through 34 by bypassing the storages 21 through 23.

In this case, in S33, the user is charged for using the selected printer, and print data is created in S34. Then, the print data is sent in S35 to the selected one of the printers 31 through 34, and a print job is carried out for the print data.

The first method is described below in which the print data is transmitted and outputted from the printers 31 through 34 after once stored in the storages 21 through 23.

In this case, the user selects a button "output to storage" in the display shown in FIG. 8(*c*). In response, the host PCs 11 through 14 display a list of available storages 21 through 23 for the selected one of the printers 31 through 34 (S28), as shown in FIG. 8(*d*). From the list, the user in S29 selects a storage with a security level and fee that fulfill the print data. If the list does not contains a storage that meets the user demand in S29, the sequence may return to S23 to select a search category again and start over the process.

With a storage selected in S29, the user is charged for using the selected printer and storage in S30, and print data is created in S31. In S32, the print data is transmitted to the selected storage.

The printing system of the present embodiment transmits print data from the host PCs 11 through 14 to the storage or printer according to either one of the first and second methods, thereby outputting the print data from a printer of a desired location. Further, according to the importance of print data, the printing system of the present embodiment selects an optimum route from a plurality of print data transmission routes with different security levels, thereby providing a printing system that has good operability and is safe to use in terms of data protection of print data.

Figure 9:
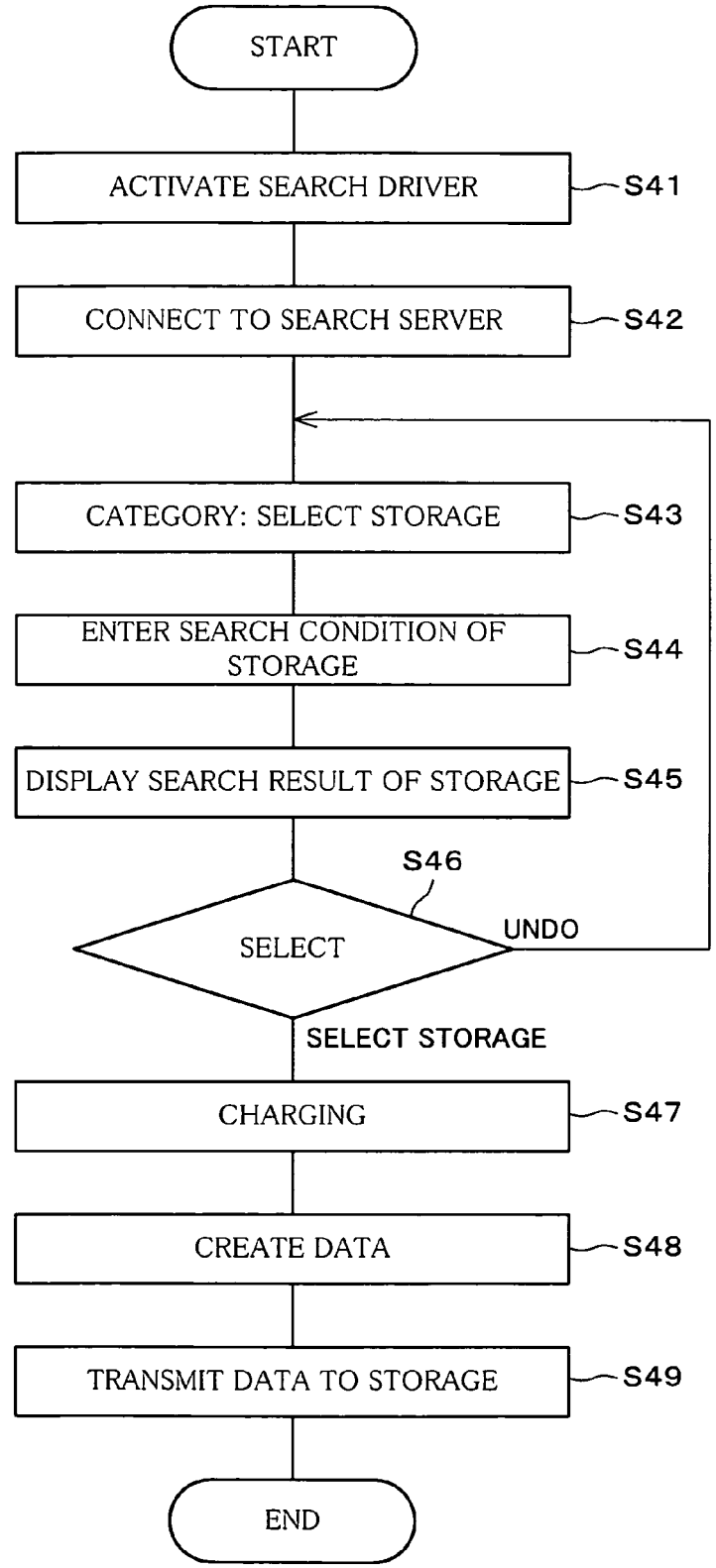
FIG. 9 is a flowchart representing procedures for searching for a transmission route of print data when the search is made by giving priority to storage in the printing system of FIG. 1.

Referring to the flowchart of FIG. 9, the following describes how a transmission route of print data is determined by giving priority to the respective functions of the storages when searching the storages.

To transmit print data from the host PCs 11 through 14, the search driver 115 of the host PCs 11 through 14 is first activated in S41 of FIG. 9. With the search driver 115 activated, the host PCs 11 through 14 are connected to the search server 41 in S42.

In response, the host PCs 11 through 14 carry out display as shown in FIG. 10(*a*), enabling a user to select a search category (search condition).

Here, if the user would like a search that prioritizes the security level of a storage, a "storage" button is pressed in S43.

Then, the host PCs 11 through 14 carry out display as shown in FIG. 10(*b*), enabling the user to enter search conditions for the storages 21 through 23 in S44, including "name" and "security" of the storages 21 through 23, for example. In the display shown in FIG. 10(*b*), the "name" of the storages 21 through 23 is selected.

For example, when the storage SC23 is selected, a list is displayed in S25, as shown in FIG. 10(*c*). If the storage SA21 is selected in S45, a list as illustrated in FIG. 10(*b*) is displayed.

From the list of FIG. 10(*c*) or FIG. 10(*d*), the user determines whether the requirements of the print data are met by the available printers for the storages SA21 through SA23, the security level determined by combinations (route) of storages and printers, and the user fee for the print job. If the displayed conditions fulfill the requirements of the print data, the user presses an "OK" button in the display of FIG. 10(*c*) or FIG. 10(*d*), and selects a storage in S46.

If the list does not contain available printers, security level, or user fee that fulfill the user demand, the sequence may return to S43 to select a search category again and start over the process.

With a storage selected in S46, the user is charged for a storage fee in S47, and print data is created in S48. The print data is sent to the selected storage in S49.

In the printing system of the present embodiment, the print data is transmitted from the host PCs 11 through 14 to the storages 21 through 23 in the manner described above. This enables the print data to be transmitted to a storage of a desired security level and stored therein. Further, according to the importance of print data, the printing system enables an optimum route to be selected from a plurality of transmission routes with different security levels, thereby providing a printing system that has good operability and is safe to use in terms of data protection.

Further, in the printing system of the present embodiment, a storage with a desired security level may be searched from the printers 31 through 34 using the search server 41, so as to acquire print data stored in the storage so searched. Referring to the flowchart of FIG. 11, the following describes how the storages 21 through 23 are searched from the printers 31 through 34.

Figure 11:
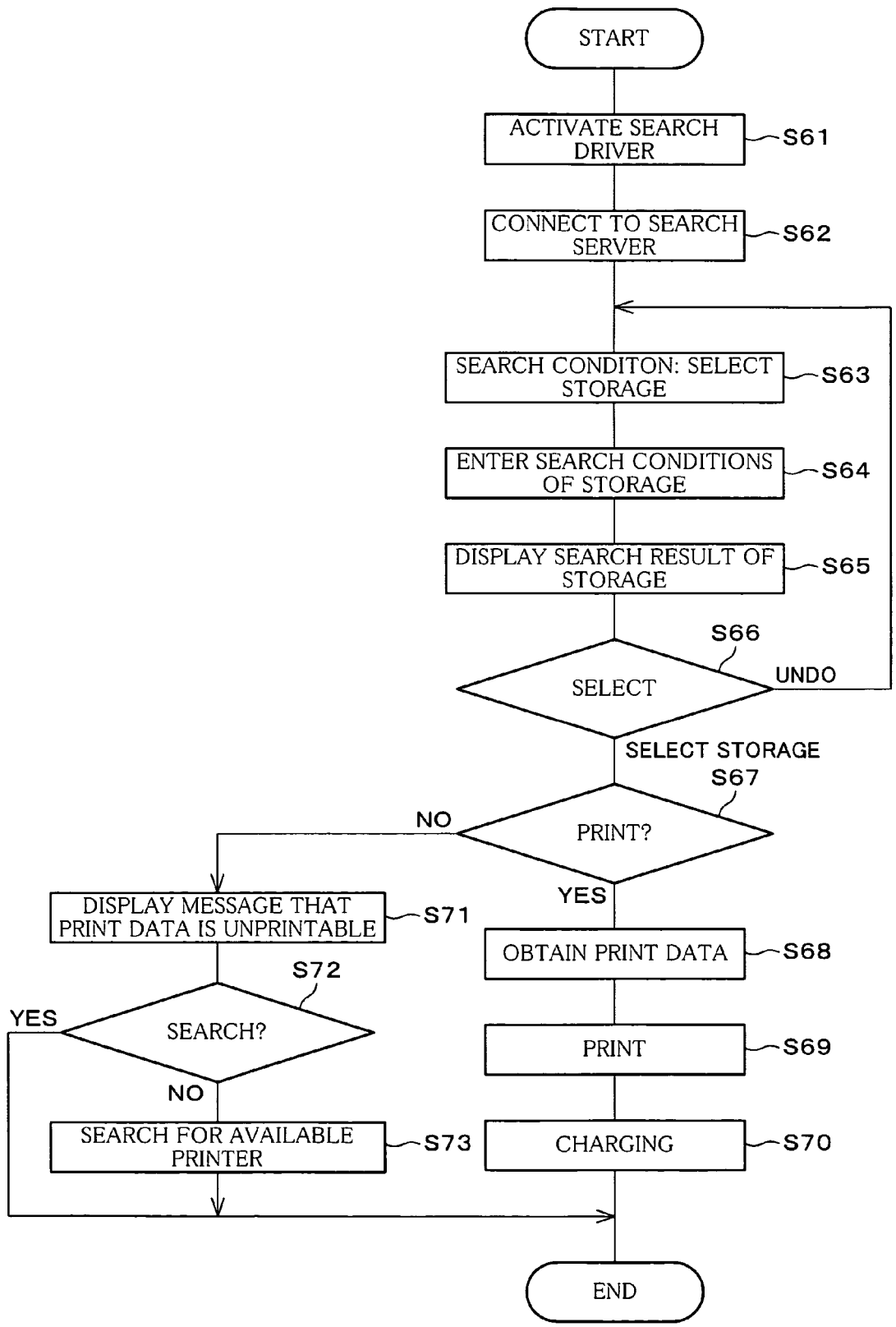
FIG. 11 is a flowchart representing procedures for searching for a transmission route of print data when the print data is obtained by searching for a storage using a printer in the printing system of FIG. 1.

In order to start a search for print data from a given printer, the search driver (not shown) of the printers 31 through 34 is first activated in S61 of FIG. 11. With the search driver activated, the printer is connected to the search server 41 in S62.

In response, the printer carries out display as shown in FIG. 10(*a*), enabling a user to select a search category (search condition).

Here, if the user would like a search according to a storage, a "storage" button is pressed in S63.

Then, the printer carries out display as shown in FIG. 10(*b*), enabling the user to enter search conditions for the storages in S64, including "name" and "security level" of the storages, for example. In S65, the printer displays a search result, enabling the user to select a storage that stores target print data in S66. The sequence may return to S63 if the user needs to select a search condition again.

If the user selects a storage containing target print data in S66, it is determined in S67 whether the print data is suitable for a print job in the printer. Namely, it is determined in S67 whether the desired print data stored in the storage is suitable for the printer in terms of security.

If the print data is determined to be printable in S67 (Yes), the print data is acquired from the selected storage. A print job is carried out for the print data in S69, and a user fee is charged in S70 before the process is finished.

On the other hand, if the print data is determined to be unprintable in S67 (No), the display section displays a message in S71, indicating that the print data is unprintable. In S72, the user can choose whether to search for an available printer again. If the user chooses to carry out a search again (Yes), a search for available printers is made in S73. On the other hand, the process is finished if the user chooses not to carry out a search again (No).

As described, in the printing system of the present embodiment, print data stored in a storage cannot be transmitted to a printer if the storage and the printer have different security levels and when the security level of the printer is lower than that of the storage.

This prevents the stored print data of the storage from being erroneously outputted from a printer whose security level is lower than that of the print data, thereby ensuring security for the print data.

As noted above, the print data stored in a storage is prevented from being transmitted to a printer when the security levels of the storage and printer do not match. In this case, a search may be made for a storage whose security level matches that of the storage, using the search section 316 of the printer operated by the user. This enables the user to quickly find a printer with a matching security level, and output the print data from the printer if the location, functions, and other conditions of the printer are satisfied.

Note that, in the described embodiment, the host PCs do not have security levels. However, the present invention is not just limited to this implementation, and security levels may also be set for the host PCs as for the storages and printers.

Second Embodiment

Referring to FIG. 12 through FIG. 14(c), the following will describe a printing system according to an electronic device network system and a data receiver search method using the electronic device network system in another embodiment of the present invention. Note that, for convenience of explanation, elements which are functionally equivalent to those described with reference to the drawings in the foregoing First Embodiment are given the same reference numerals and explanations thereof are omitted here.

A printing system of the present embodiment is used in basically the same network environment as that of the First Embodiment. However, the printing system of the present embodiment differs from that of the First Embodiment in that the printing system is connected to a network via an intranet, which is used for communications in a confined area as in a company.

Figure 12:
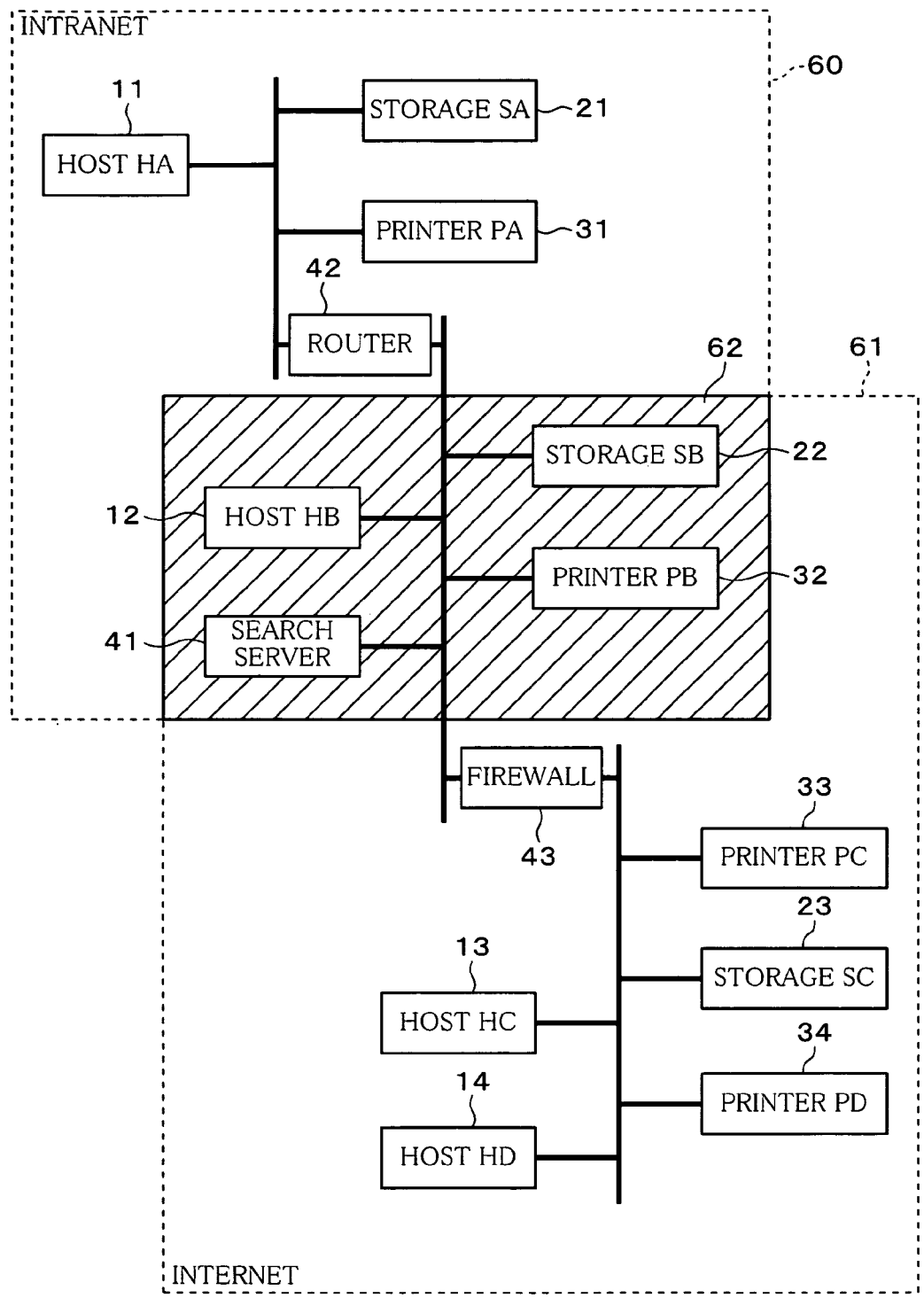
FIG. 12 is a block diagram illustrating a network structure constituting a printing system according to another embodiment of the present invention.

In a network environment of the printing system of the present embodiment, the host HA11, the storage SA21, and the printer 31 are connectable only to an intranet 60, as shown in FIG. 12.

The host HB12, the storage SB22, and the printer 32 are connectable to the intranet 60 and an Internet 61. A search server 41 is connectable to host PCs and printers on the intranet 60 and the Internet 61.

Further, a host HC13, a host HD14, a printer PC33, a storage SC23, and a printer PD34 are connectable only to the Internet 61.

In the printing system of the present embodiment, some of the devices on the intranet 60 are connected to a network 62 (shaded area in FIG. 12) that is connectable both to the intranet 60 and the Internet 61. For data protection (security), these devices are connected to the other devices on the intranet 60 via a router (access control means) 42 which constitutes a data security system. Further, for data protection (security), the devices on the network 62 (shaded area in FIG. 12) that is defined by both the Internet 61 and the intranet 60 are connected to the devices on the Internet 61 via a firewall (access control means) 43 which constitutes a data security system.

As shown in FIG. 13(a), the host information storing section 113 of the host PCs 11 through 14 stores information of storages available to the host PCs 11 through 14. The host information storing section 113 also stores locations of the storages. The availability of the storages is determined by a network structure, as shown in FIG. 12. For example, the host HC13 is also connectable to the storage SB22 on the intranet 60.

As shown in FIG. 13(b), the printer information storing section 313 of the printers 31 through 34 stores information of storages available to the printers 31 through 34. As with the host PCs 11 through 14, the availability of the storages is determined by a network structure, as shown in FIG. 12. For example, the printer PC33 is also connectable to the storage SB22. The printer information storing section 313 also stores locations of the printers, and information concerning print functions, including color printing, double-sided printing, and stapling, for example. The stored information may be displayed through a display section of each printer, or may be confirmed at each host PC via the search server 41.

As shown in FIG. 13(c), the storage information storing section 213 of the storages 21 through 23 stores information of hosts and printers available to the storages 21 through 23. The storage information storing section 213 also stores locations of these hosts and printers. The availability of hosts and printers is indicated by the network structure of FIG. 12. The storage SB22 is connectable to the host HC13 and the printer PC33 on the Internet 61.

As shown in FIG. 13(d), the device information storing section 413 of the search server 41 stores hosts HA through HD and printers PA through PD available to the storages SA through SC. The device information storing section 413 also stores security levels for the print jobs carried out by the printers via the hosts and storages.

With the search server 41 provided with the device information storing section 413, the printing system of the present embodiment is able to set a security level according to the importance of the print data. The print data is then processed by selected devices (storages and printers) corresponding to the security level of the print data being processed.

As shown in FIG. 13(d), the printing system of the present embodiment provides three print routes (combinations of storages, hosts, and printers) for print data of different security levels.

As the term is used herein, security level is "high" when the printing system offers high data protection safety in terms of both network and data itself. For example, the security level of a print route in the printing system is high when the print route links only devices on the intranet 60 in a company.

As the term is used herein, security level is "medium" when the printing system offers high safety in terms of data itself but poses safety problems in terms of network. For example, the security level of a print route in the printing system is medium when the print route may be linked to hosts, printers, and storages on the Internet 61 outside the company, in addition to hosts and printers installed in the company.

As the term is used herein, the security level of a print route is "low" when the data protection safety involves some danger in terms of network and data itself. For example, the security level of a print route is "low" when the print route links devices that offer free access on the Internet 61.

The host HA11, the storage SA21, and the printer PA31 all have a high security level because these devices are on the intranet 60 and cannot be accessed via the Internet 61 from devices on the Internet 61.

The host HB12, the storage SB22, and the printer PB32 are on the intranet 60 and the Internet 61, and are connectable to devices on the intranet 60 and the Internet 61. The host HB12, the storage SB22, and the printer PB32 are accessible via the Internet 61 from devices on the internet 61, but access thereto is limited by the firewall 43 that connects the host HB12, the storage SB22, and the printer PB32 to the Internet 61. Therefore, the security levels for these devices are "medium" and are higher than the security levels of devices connected to the Internet 61 without the firewall 43.

The printer PD34, the host HC13, the host HD14, the storage SC23, and the printer PC33 are connected to the Internet 61 without the firewall 43, and are accessible via the Internet 61 from any devices on the Internet 61. Accordingly, the security levels of these devices are "low."

Figure 14:
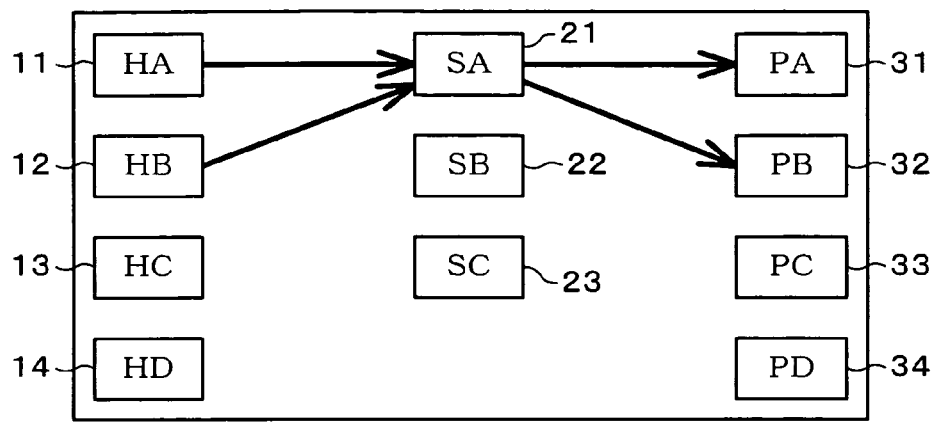
FIG. 14(a) through FIG. 14(c) are block diagrams illustrating transmission routes of print data according to security level.
Figure 14:
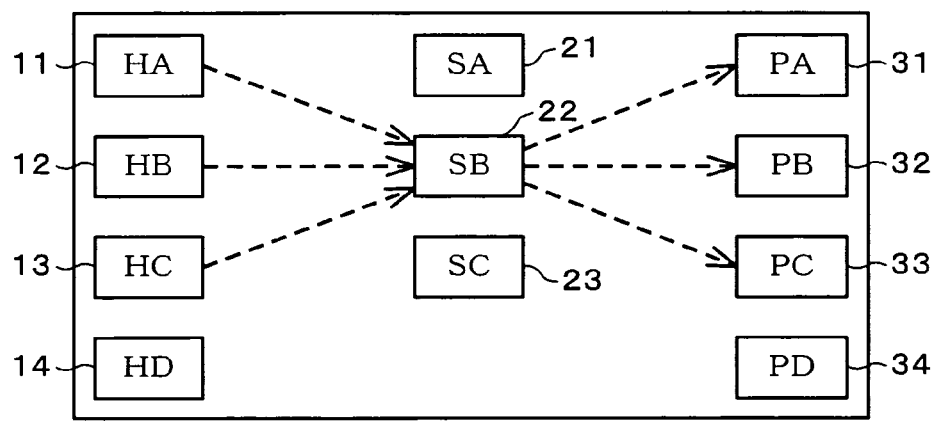
Figure 14:
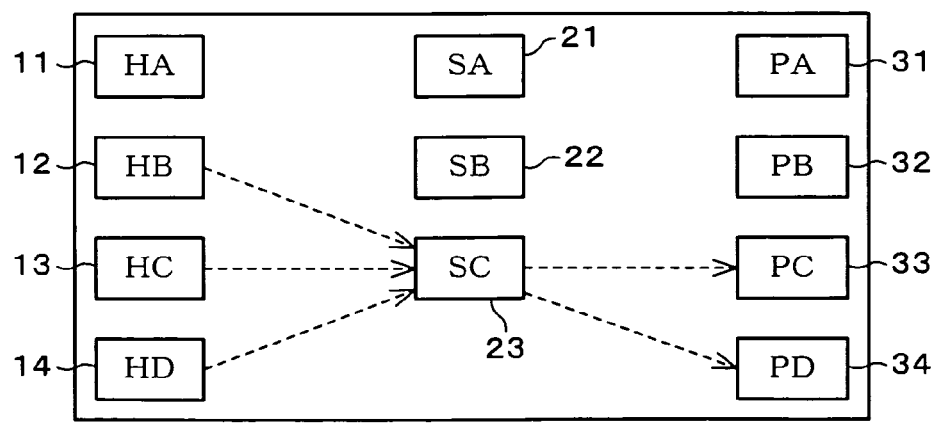

In the printing system of the present embodiment, the search server 41 may additionally be provided with a route search section (route search means) (not shown), which, according to the security level, searches print routes linking storages and printers as shown in FIG. 14(*a*) through FIG. 14(*c*).

For example, when the user's desired security level is "high," the search server 41 searches for a print route that links the host HA11 or HB12, the storage SA21, and the printer PA31 or PB32, as shown in FIG. 14(*a*).

As another example, when the user's desired security level is "medium," the search server 41 searches for a print route that links: one of the hosts HA11, HB12, and HC13; the storage SC23; and one of the printers PA31, PB32, and PC33, as shown in FIG. 14(*b*).

Further, when the user's desired security level is "low," the search server 41 searches for a print route that links: one of the hosts HB12, HC13, and HD14; the storage SC23; and one of the printers PC33 and PD34, as shown in FIG. 14(*c*).

In this manner, with the search function, the printing system of the present embodiment enables an optimum print route to be easily searched according to the user's desired security level, thereby enabling the user to select a print route more efficiently.

Note that, as in the First Embodiment, the printing system of the present embodiment is also able to transmit print data according to the security level. The manner in which the print data is transmitted according to the security level is already described in the First Embodiment, and further explanations thereof are omitted here.

Third Embodiment

Referring to FIG. 15 through FIG. 18, the following will describe a scanner system according to an electronic device network system and a data receiver search method using the electronic device network system in yet another embodiment of the present invention. Note that, for convenience of explanation, elements which are functionally equivalent to those described with reference to the drawings in the foregoing First Embodiment are given the same reference numerals and explanations thereof are omitted here.

Figure 15:
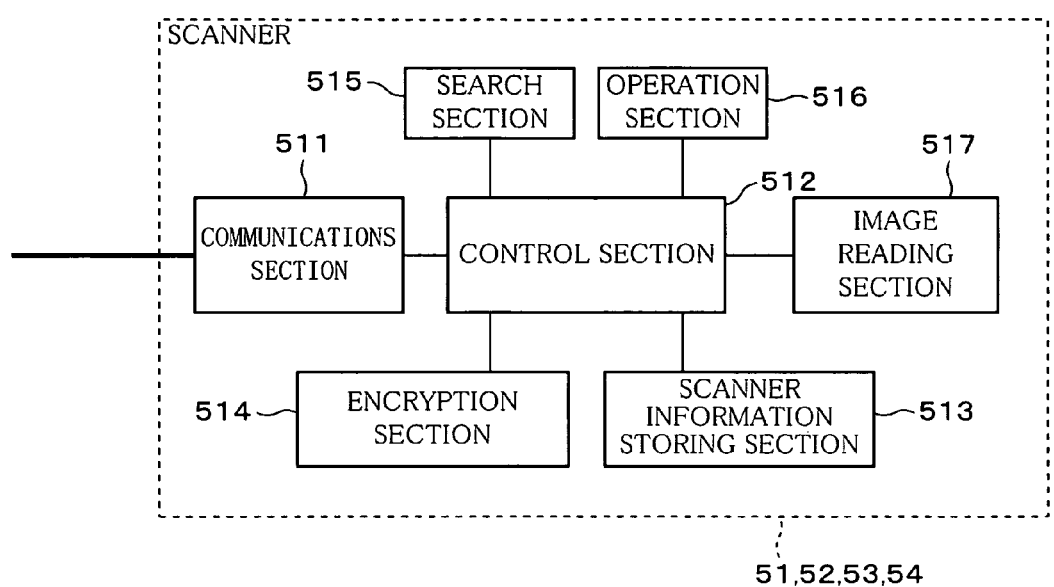
FIG. 15 is a block diagram illustrating an internal structure of a scanner in a scanner system according to yet another embodiment of the present invention.

A scanner system of the present embodiment includes scanners (electronic devices) 51 through 54 as illustrated in FIG. 15, in addition to the host PCs (external devices) 11 through 14, the storages 21 through 23, the printers 31 through 34, and the search server (search means) 41 as shown in FIG. 1. In the present embodiment, scan data are transmitted from the scanners 51 through 54 to the host PCs. In this respect, the present embodiment differs from the foregoing First and Second Embodiments in which print data are transmitted from the host PCs to the printers 31 through 34.

The scanners 51 through 54 each include a communications section 511, a control section 512, a scanner information storing section 513, an encryption section 514, a search section 515, an operation section 516, and an image reading section 517.

The communications section 511 is an interface for sending and receiving data to and from the external devices.

The control section 512 is a central unit, controlling the entire device.

The scanner information storing section 513 stores scanner information, examples of which include the locations, functions, and security levels of the scanners. The information stored in the scanner information storing section 513 may be displayed using display means (not shown) to enable a user to confirm the stored information.

The encryption section 514 protects scan data. Specifically, the encryption section 514 encrypts scan data so that the scan data will not be read easily by a third party.

The search section 514 searches the storages and printers on a network according to security levels or other conditions.

The operation section 516 is used by a user to directly operate a scanner, and receives user instructions.

The image reading section 517 serves as a scanner to read documents and capture document images as image data.

FIG. 16(*a*) through FIG. 16(*d*) show types of information stored in the respective information storing sections 113, 213, 313, and 413 of the storages 21 through 23, the printers 31 through 34, the host PCs 11 through 14, and the search server 41.

The storage information storing section 213 provided in each of the storages 21 through 23 stores information including "storage name," "storage fee," and "security level (data protections)," as shown in FIG. 16(*a*).

For example, in the storage SA21, security level is "high," and the encryption protocol level is 2.0, with which print data can be encrypted before it is transmitted.

In the storage SB22, security level is "medium," and the encryption protocol level is 1.0, with which print data can be encrypted before it is transmitted.

In the storage SC23, security level is "low," and there is no data protection.

That is, the scan system of the present embodiment provides three storages of different security levels for data protection, as described with reference to FIG. 3 in the First Embodiment.

The scanner information storing section 513 provided in each of the scanners 51 through 54 stores information, including "printer name," "data protection" indicative of the security levels of the scanners 51 through 54, "location" where the scanner is installed, and "scanner functions" of the scanner, as shown in FIG. 16(*b*).

A scanner ScA51 has encryption protocol levels 2.0 and 1.0. In addition, the scanner ScA51 has an encrypting function. The security level is "top secret."

A scanner ScB52 has encryption protocol levels 2.0 and 1.0, and the security level is "high."

In a scanner ScC53, the encryption protocol level is 1.0, and the security level is "medium."

A scanner ScD54 offers no data protection, and the security level is "low."

As noted above, the scanner information stored in the scanner information storing section 513 includes "location" where the scanner is installed, and "scanner functions" of the printer, such as color printing, black-and-white printing, and resolutions. These information may be displayed in a display section (not shown) of the scanner, or may be confirmed at the host PC via the search server 41.

The host information storing section 113 provided in each of the host PCs 11 through 14 stores information, including "host name," "data protection" indicative of the security levels of the host PCs 11 through 14, and information concerning the presence or absence of data encryption/decryption functions, as shown in FIG. 16(*c*).

In the present embodiment, the host PCs 11 through 14 all have encryption protocol levels 2.0 and 1.0, so that the scan data can be encrypted before it is transmitted. Further, the host PCs 11 through 14, including the host HD14 with no encryption protocol, can accommodate any of the security levels "high," "medium," and "low."

The device information storing section 413 of the search server 41 stores information concerning routes, the presence or absence of encryption protocol, the presence or absence of data encryption, and security level, as shown in FIG. 16(*d*).

The information stored in the search server 41 may be acquired by gathering scanner information from the scanners 51 through 54, storage information from the storages 21 through 23, and host information from the host PCs 11 through 14. Alternatively, the search server 41 may store information that has been created beforehand.

With the device information storing section 413 in the search server 41, the scanner system of the present embodiment is able to select a device (storages 21 through 23, host PCs 11 through 14) from the scanners 51 through 54 according to the necessary security level for the scanner data.

The search server 41 may additionally be provided with a route search section (route search means) (not shown), which, according to the security level, searches data transmission routes linking scanners, storages, and host PCs as shown in FIG. 17(*a*) through FIG. 17(*f*).

For example, when the user's desired security level is "top secret," the search server 41 may search for a transmission route that links the scanner ScA51, the storage SA21, and the host HA11, and that allows data to be transmitted in an encrypted form, as shown in FIG. 17(*a*).

Specifically, the scanner first encrypts scan data. The scan data, in its encrypted form, is transmitted with encryption protocol 2.0 from the storage. The encrypted scan data is decrypted at the host PC when it is used.

When the user's desired security level is "high," the search server 41 may search for a transmission route that links the scanner ScA51, the scanner ScB52, the storage SA21, and the hostHA11 or HB12, as shown in FIG. 17(*b*).

Specifically, the scanner first transmits data with encryption protocol 2.0, and the data is stored in the storage. When using data, the data is decrypted in the storage and transmitted with encryption protocol 2.0 to the host PC.

Alternatively, when the user's desired security level is "high," the search server 41 may search for a transmission route that links the scanner ScA51, the storage SB22, and the host HA11 or HB13, and that allows data to be transmitted in an encrypted form, as shown in FIG. 17(*c*).

Specifically, the scanner first encrypts scan data, and transmits the encrypted scan data with encryption protocol 1.0. The scan data, in its encrypted form, is stored in the storage. When using data, the scan data is transmitted with encryption protocol 1.0 and decrypted at the host PC.

When the user's desired security level is "medium," the search server 41 may search for a transmission route that links: one of the scanners ScA51, ScB52, and ScC54; the storage SB22; and one of the hosts HA11, HB12, and HC13, as shown in FIG. 17(*d*).

Specifically, the scanner first transmits scan data with encryption protocol 1.0, and the encrypted scan data is stored in the storage. When using data, the scan data is transmitted with encryption protocol 1.0.

Alternatively, when the user's desired security level is "medium," the search server 41 may search for a transmission route that links the scanner ScA51, the storage SB23, and the host HA11 or HB13, and that allows data to be transmitted in an encrypted form, as shown in FIG. 17(*e*).

Specifically, the scanner first encrypts scan data, and transmits the encrypted scan data with no security. The encrypted scan data is then stored in the storage, and is transmitted with no security. When using data, the encrypted scan data is decrypted.

When the user's desired security level is "low," the search server 41 may search for a transmission route that links: one of the scanners ScA51 through ScD54; the storage SC23; and one of the hosts HA11 through HD14, as shown in FIG. 17(*f*).

Specifically, the scan data is first transmitted with no security, and is stored in the storage. The scan data is then transmitted to the host PC with no security.

In this manner, the scanner system of the present embodiment enables a data transmission route to be easily searched according to the security level, thereby transmitting data from a scanner to a host PC, taking into account security for data protection.

Figure 18:
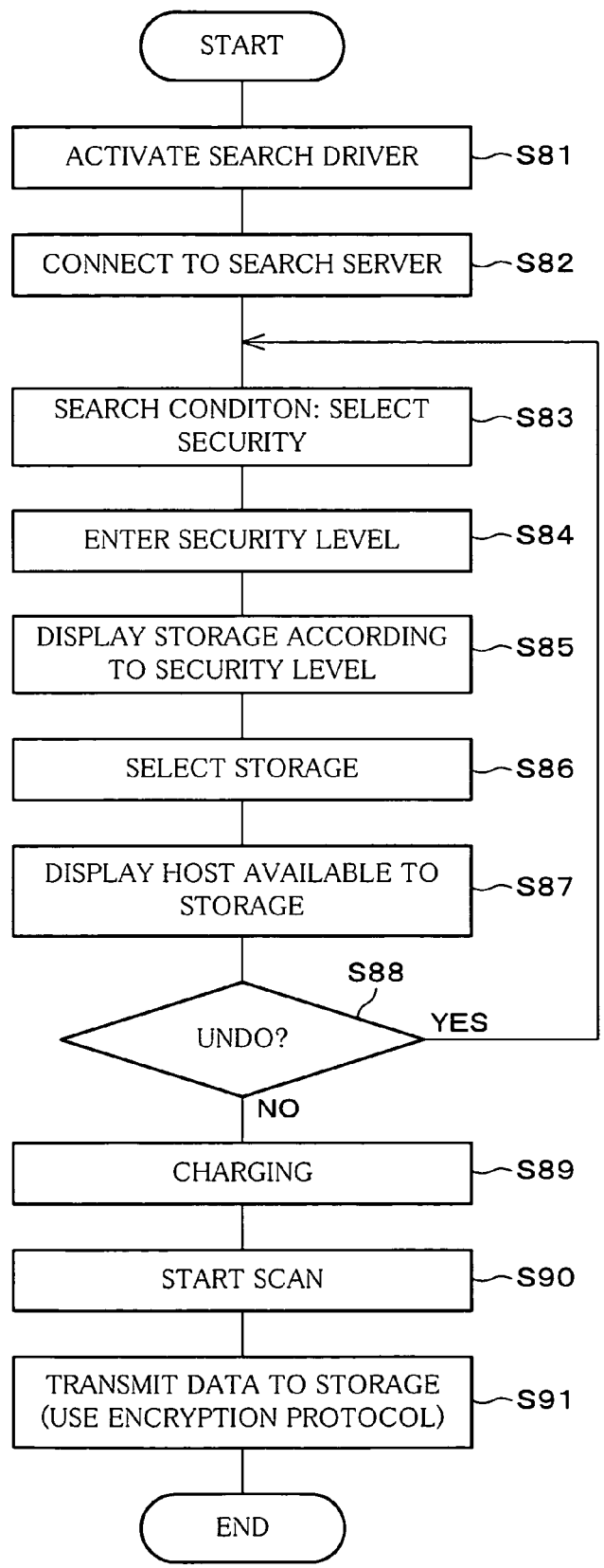
FIG. 18 is a flowchart representing procedures for searching for a transmission route when data is transmitted from the scanner to a host PC in the scanner system of FIG. 15.

To transmit scan data from the scanners 51 through 54, the search section 515 of the scanners 51 through 54 is first activated in S81 of FIG. 18. With the search section 515 activated, the scanners 51 through 54 are connected to the search server 41 in S82.

Here, if a user would like a search according to the security level, a "security" button is pressed in S83.

For example, when a "high" security level is selected in S84, storages are displayed in S85 according to their security levels.

In S86, the user selects one of the three storages.

With a storage selected in S86, available host PCs are displayed in S87 according to the selected storage and the security level.

If the locations and functions of the available host PCs in the display do not meet the user demand, i.e., if Yes in S88, the sequence may be repeated from S83.

On the other hand, if the security levels or other conditions of the available host PCs meet the user demand, i.e., if No in S88, a storage fee is charged in S89, and scan is started in S90. The scan data is then encrypted with an encryption protocol, and the encrypted scan data is transmitted to the storage in S91.

In the scanner system of the present embodiment, the scan data is transmitted from the scanner to the storage in the manner described above. This enables the scan data to be transmitted on a route according to the security level of the scan data, thereby realizing a scanner system that is safe to use in terms of data protection.

Note that, the data may be transmitted from the host PC to the storage and printer as in the First and Second Embodiments. Alternatively, the data may be transmitted from an electronic device, such as a scanner, to the storage, host PC, and other external devices, as in the present embodiment.

Further, the number of available transmission routes for a user can be increased by combining the encrypted data with the protection functions of communicated data, such as the encryption protocol rendered to each of the scanners, storages, and host PCs, as shown in FIG. 17(*a*), FIG. 17(*c*), and FIG. 17(*e*).

It should be appreciated that the electronic device network systems described in the foregoing First through Third Embodiments are merely one example of the present invention, and the present invention is not just limited to these implementations. For example, the present invention is also applicable to a printing system having larger numbers of host PCs, storages, and printers. Further, other than the printing system, the electronic device network system of the present invention may be applied to a network using an electronic device such as a scanner, not a printer, as described in the Third Embodiment.

Further, in the First through Third Embodiments, the electronic device (host PC, scanner), external device (printer, host PC), and storing means (storage) each have its own security level. However, the present invention is not just limited thereto. For example, a user may set his or her security level, and it may be combined with the electronic device, external device, and storing means, etc. In this way, for highly secret data, only a limited number of users can have access to devices with a "top secret" security level, enabling the electronic device network system to be structured with improved security.

It should be appreciated that the present invention is not just limited to the foregoing embodiments, and the invention may be varied in many ways within the scope of the claims. Further, the technical means described in the foregoing embodiments may be suitably combined to constitute a new embodiment, and all such combinations of the technical means are intended to fall within the scope of the present invention.

In one aspect of the invention, the present invention is a printing system including a plurality of storages for storing print data transmitted from a host PC, and a plurality of printers for acquiring the print data from the storages and printing the acquired print data, wherein the storages have different security levels, and the printing system further includes search means for searching for a storage storing the print data, according to the security level of the print data specified by a user.

In one aspect of the invention, the present invention is a printing system including a plurality of storages for storing print data transmitted from a host PC, and a plurality of printers for acquiring the print data from the storages and printing the acquired print data, wherein the printing system further includes: a first search means for searching for a storage storing the print data, according to the security level of the print data specified by a user; a display means for displaying a security level of the storage that was selected based on the result of search by the search means; and a second search means for searching for acquiring the print data from the storage and searching for an available printer.

In an electronic device network system of the present invention, an electronic device, at least one of a plurality of storing means, and at least one of a plurality of external devices each have a security level.

When transmitting data from the electronic device to the external devices via the storing means, the electronic device network system enables the user to select a storing means and an external device whose security functions correspond to a desired security level of the user, thereby transmitting the data to the storing means and the external device more safely and more easily.

Thus, when transmitting important data requiring security, the user simply selects a storing means and an external device whose security levels match the user's security level, without entering an ID or password. As a result, an electronic device network system is realized that ensures data security.

The electronic device network system preferably includes a search means for searching the electronic device, storing means, and external devices according to the security levels of the respective security functions of the electronic device, storing means, and external devices.

Thus, the user only needs to set a security level according to the importance of transmitted data in order to search the network for a storing means and external device whose security levels correspond to the user's security level. The user is therefore able to transmit data on a route linking a storing means and external device whose security functions provide the user's desired security level.

The electronic device network system preferably includes a search means for searching for an external device according to the location or functions of the external device.

This enables the user to search for an external device according to the location or functions of the external device used to output data, enabling the user to more easily select from the network an external device that fulfills the user demand.

For example, when the user prefers a particular location of data output, a search for an external device is made first based on locations of the external devices. Based on the search result, a further search is made according to the security levels, functions, and other criteria of the external devices, thereby searching for an external device that meets the user demand.

When the transmitted data requires special processing, a search for an external device is made based on functions of the external devices, enabling a more refined search.

It is preferable that the search means searches for a data transmission route from the electronic device to the storing means or external device.

This enables the user to search for a transmission route of data from the electronic device to the external device via the storing means, based on his or her desired security level, or the locations, functions, and other criteria of the external devices.

For example, when the user's desired security level for the transmitted data is "high," a search is made for a storing means and external device whose security functions provide a "high" or higher security level. The transmission route linking the storing means and external device so searched is displayed as the search result.

This is more efficient in finding a transmission route that matches the desired security level, as compared with finding a transmission route by combining a storing means and an external device that are separately searched according to the user's desired security level.

It is preferable that the external device includes a search section for searching for a storing means whose security level corresponds to the security level of the external device making the search.

This enables the user operating the external device to search for a storing means whose security function is suitable for data transmission to the user's external device, thereby enabling the user operating the external device to directly acquire necessary data from the storing means storing the data. In this way, the security of output data can be ensured even for data acquired by the external device from the storing means. Further, by searching for a storing means that can transmit data to the external device operated by the user, it is ensured that the security levels are matched to enable the stored data in the storing means to be acquired by the external device making the search.

It is preferable that the respective security functions of the electronic device, the storing means, and the external device are determined depending on whether the electronic device, the storing means, and the external device belong to which of a plurality of networks that are connected to one another via access control means.

For example, three security levels can be set for a user in a company when a company's intranet that is connected to the Internet via access control means such as a router or firewall is combined with the Internet that has free access. More specifically, a "high" security level is set for devices that are connectable only to the intranet in the company, a "medium"

security level is set for devices that are connectable to both the intranet and the Internet, and a "low" security level is set for devices that are connectable to only the Internet.

For important print data, the user may send the data using a device that is connectable only to the intranet in the company and output the data from this device. In this way, the data will not be leaked to external devices that are connectable only to the Internet, thereby outputting data safely and securely.

The firewall may prohibit access from devices with particular addresses, or may prohibit communications that uses a port with a specific number, or may prohibit access from particular types of software. The firewall may be realized by hardware (firewall server, etc.) or software (firewall software).

The external device is preferably an image forming device.

In this way, the storing means and external devices on a network may be searched, and the print data transmitted from the electronic device such as a host PC can be transmitted to a storing means and image forming device whose security levels match a user's desired security level. As a result, a printing system can be realized that ensures data security.

The electronic device is preferably a scanner.

In this way, a scanner system is realized in which image data or other types of data read by the scanner is safely transmitted to the storing means, external devices, and other types of electronic devices.

In a data receiver search method using an electronic device network system according to the present invention, the electronic device, storing means, and external device each have a security function, and method searches for a storing means and an external device whose respective security functions match a security level set by a user, when the electronic device transmits data.

The method is for an electronic device network system that accommodates, for example, BMLinkS®, in which a plurality of electronic devices, storing means, and external devices are installed at discrete locations on a network. In the system, the method searches for a suitable storing means and external device according to a user's desired security level, thus easily finding a storing means and external device to which data can be safely sent to, by searching the storing means and external devices on a network. Thus, for important data requiring security, the user simply selects a storing means and an external device whose security levels match his or her security level, without entering an ID or password. As a result, an electronic device network system is realized that ensures data security.

It is preferable that a search for an external device is made according to the location or functions of the external device.

This enables the user to search for an external device based on the location or functions of the external device, enabling the user to more easily select from the network an external device that fulfills the user demand. For example, when the user prefers a particular location of data output, a search for an external device is made first based on locations of the external devices. Based on the search result, a further search is made according to the security levels, functions, and other criteria of the external devices, thereby searching for an external device that meets the user demand.

When the transmitted data requires special processing, a search for an external device is made based on functions of the external devices, enabling a more refined search.

It is preferable that a search is made for a data transmission route from the electronic device to the storing means or external device.

This enables the user to search for a transmission route of data from the electronic device to the external device via the storing means, based on his or her desired security level, or the locations, functions, and other criteria of the external devices. For example, when the user's desired security level for the transmitted data is "high," a search is made for a storing means and external device whose security functions provide a "high" or higher security level. The transmission route linking the storing means and external device so searched is displayed as the search result. This is more efficient in finding a transmission route that matches the desired security level, as compared with finding a transmission route by combining a storing means and an external device that are separately searched according to the user's desired security level.

It is more preferable that transmission of data to the electronic device, the storing means, and the external devices is prohibited when the respective security levels of the electronic device, the storing means, and the external device do not match the security level set by the user.

In this way, when the user transmits important data requiring security, the data will not be transmitted erroneously to a storing means or external device that provides free access. As a result, it is ensured that the data is transmitted more securely to a desired external device with required security functions.

It is preferable that, when stored data in a storing means needs to be outputted from an external device but an external device and a storing means storing necessary data have different security levels so that the data is prevented from being transmitted from the storing means to the external device, a search is made for an external device whose security level matches the security level of the storing means storing the necessary data.

This is preferable because it enables the search means to search for an external device that can output necessary data stored in a storing means, when the security level of the external device currently used by the user does not match the security level of the storing means storing the necessary data. As a result, the user is able to always grasp available external devices for data output, and output necessary data from an external device whose security level is suitable for the print data.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An electronic device network system comprising:
   an electronic device for transmitting print data via a network;
   a plurality of storing means for storing the print data transmitted from the electronic device;
   a plurality of printers for acquiring the print data from the storing means and printing the acquired print data;
   a setting section for setting a security level of the print data to be transmitted, wherein the security level of the print data is set in the setting section responsive to an input from a user of the electronic device, where the set security level being selected by the user is selected from a plurality of identified security levels of the print data;
   a network connecting the electronic device, the plurality of storing means, and the plurality of printers to one another;
   wherein the electronic device, at least one of the plurality of storing means, and at least one of the plurality of printers each have a security function and another security level associated with the set security level of the print data, where at least one of the plurality of storing means has a security level that is different from another of the plurality of storing means, and at least one of the plurality of printers has a security level that is different from another of the plurality of devices printers;

a search means for searching the plurality of storing means and for searching the plurality of printers, responsive to selection of the security level of the print data by the user, so as to identify one or more given storing means and one or more given printers each of whose security level corresponds to the security level of the print data which security level is set in the setting section;

a selecting means for providing results of the searching to the user and for providing an output, the output corresponding to: (i) a selected one of the identified one or more given storing means whose security level corresponds to the security level of the print data which security level is set in the setting section and (ii) a selected one of the identified one or more given printers whose security level corresponds to the security level of the print data which security level is set in the setting section, the selected ones being selected by the user from the provided search results; and wherein the electronic device transmits the print data to the selected one of the given storing means in response to said output from the selecting means, and the transmitted print data is transmitted to the selected one of the given printers by the selected one of the given storing means.

2. The electronic device network system as set forth in claim 1, wherein:

the plurality of storing means includes a first storing means having a first security level, and a second storing means having a second security level, the first security level being higher than the second security level.

3. The electronic device network system as set forth in claim 2, wherein the first storing means transmits print data by encrypting the print data, and the second storing means transmits the print data without encrypting the print data.

4. The electronic device network system as set forth in claim 2, wherein the first storing means is connected to the Internet via a firewall that limits access from devices on the Internet, and the second storing means is connected to the Internet without the firewall.

5. The electronic device network system as set forth in claim 2, wherein the first storing means does not have access to the Internet, and the second storing means have access to the Internet.

6. The electronic device network system as set forth in claim 1, wherein the electronic device, at least one of the plurality of storing means, and at least one of the printers each have a communications function for encrypted the print data.

7. The electronic device network system as set forth in claim 1, wherein the search means includes means for searching for a printer according to locations or functions of the printers.

8. The electronic device network system as set forth in claim 7, wherein the search means further includes means for searching for a transmission route of the transmitted print data from the electronic device via the storing means to the printers.

9. The electronic device network system as set forth in claim 1, wherein the search means further includes means for searching for a transmission route of the transmitted print data from the electronic device via the storing means to the printers.

10. The electronic device network system as set forth in claim 1, wherein each of the plurality of printers includes a search section for searching for a storing means whose associated security level matches the associated security level of one of the plurality of printers which is making such a search.

11. The electronic device network system as set forth in claim 1, wherein the electronic device includes a displaying means for displaying a result of search made by a search means according to search conditions.

12. The electronic device network system as set forth in claim 1, wherein the respective associated security level of the electronic device, at least one of the plurality of storing means, and at least one of the plurality of printers is further established based on whether the electronic device, the storing means, and the printers belong to which of a plurality of networks that are connected to one another via access control means.

13. The electronic device network system as set forth in claim 1, wherein the electronic device comprises a scanner.

14. A data receiver search system comprising:

a plurality of storing means for storing print data, each storing means having a different security level associated therewith;

a plurality of printers for acquiring the print data from the storing means and printing the acquired print data;

an electronic device connected to the plurality of storing means and the plurality of printers via a network;

a search device being connected to the electronic device;

wherein the electronic device includes:
　a transmission section for transmitting the print data to the storing means,
　a setting section for setting a security level of the print data to be transmitted, wherein the security level of the print data is set in the setting section responsive to an input from a user of the electronic device, where the set security level is selected by the user from a plurality of identified security levels of the print data;

wherein the search device includes a search section for searching the plurality of storing means and for searching the plurality of printers, responsive to selection of the security level of the print data by the user, so as to identify one or more given storing means and one or more given printers each of whose respective associated security level corresponds to the security level of the print data which security level is set in the setting section;

a selecting means for providing results of the searching to the user and for providing an output, the output corresponding to: (i) a selected one of the identified one or more given storing means whose security level corresponds to the security level of the print data which security level is set in the setting section and (ii) a selected one of the identified one or more given printers whose security level corresponds to the security level of the print data which security level is set in the setting section, the selected ones being selected by the user from the provided search results; and wherein the transmission section transmits the print data corresponding to the set security level to the selected given storing means in responsive to said output, and the transmitted print data is transmitted to the selected given printer by the selected given storing means.

15. A data receiver search method using an electronic device network system that comprises:

an electronic device for transmitting print data via a network;

a plurality of storing means for storing the print data transmitted from the electronic device, where at least one of the plurality of storing means has a security level that is different from another of the plurality of storing means; and a plurality of printers for acquiring the print data from the storing means and printing the acquired print data, where at least one of the plurality of printers has a security level that is different from another of the plurality of printers, a network connecting the electronic device, the storing means, and the printers to one another, and the electronic device, at least one of the plurality of storing means, and at least one of the printers each having a security function and an associated security level; and wherein said data receiver search method includes the steps of:

(a) the user of the electronic device setting a security level of the print data to be transmitted, wherein said setting including the user selecting the set security level of the print data from a plurality of identified security levels of the print data;

(b) searching, responsive to selection of the security level of the print data by the user, for one or more given storing means from the plurality of storing means and one or more given printers from the plurality of printers whose respective associated security level match the security level of the print data which security level is set in step (a) when the electronic device transmits the print data; and (c) the user selecting one of the one or more given storing means and the one or more given printers as identified in step (b) and providing an input corresponding to said selecting; and (d) allowing transmission of the print data to the selected one of the given storing means or the given printer(s) identified in step (c) responsive to the input from step (c).

16. The data receiver search method as set forth in claim 15, wherein said searching includes searching for a printer according to a location or functions of the printer.

17. The data receiver search method as set forth in claim 15, wherein said searching includes searching for a transmission route of the transmitted print data from the electronic device via the storing means to the printers.

18. The data receiver search method as set forth in claim 15, further comprising the steps of:

prohibiting transmission of print data from the electronic device or from the storing means when the respective associated security levels of the electronic device, the storing means, and the printers do not match the desired security level of the print data as established by the user; and wherein said allowing transmission of the print data includes allowing transmission of the print data from the given storing means to the given printer when the respective associated security levels of the electronic device, the storing means, and the printers match the desired security level of the print data.

19. The data receiver search method as set forth in claim 18, wherein when the stored print data in a storing means needs to be outputted from a printer and the printer and the storing means storing the stored print data have different associated security levels so that the stored print data is prevented from being transmitted from the storing means to the printer, said data receiver search method further comprises the step of:

repeating said step of searching to identify another given printer whose associated security level matches the associated security level of the storing means storing the stored print data.

* * * * *